US012773733B2

(12) United States Patent
Otawa

(10) Patent No.: US 12,773,733 B2

(45) Date of Patent: Oct. 27, 2026

(54) WORK MACHINE

(71) Applicant: DMG MORI CO., LTD., Nara (JP)

(72) Inventor: Takeshi Otawa, Nara (JP)

(73) Assignee: DMG MORI CO., LTD., Nara (JP)

( * ) Notice: Subject to any disclaimer, the term of this patent is extended or adjusted under 35 U.S.C. 154(b) by 378 days.

(21) Appl. No.: 18/565,969

(22) PCT Filed: Jun. 4, 2021

(86) PCT No.: PCT/JP2021/021444

§ 371 (c)(1),
(2) Date: Nov. 30, 2023

(87) PCT Pub. No.: WO2022/254719

PCT Pub. Date: Dec. 8, 2022

(65) Prior Publication Data

US 2024/0261866 A1 Aug. 8, 2024

(51) Int. Cl.

| | |
|---|---|
| ***B23B 3/06*** | (2006.01) |
| ***B23K 26/342*** | (2014.01) |
| ***B23P 23/04*** | (2006.01) |
| ***B33Y 30/00*** | (2015.01) |

(52) U.S. Cl.

CPC ............ *B23B 3/065* (2013.01); *B23K 26/342* (2015.10); *B23P 23/04* (2013.01); *B33Y 30/00* (2014.12)

(58) Field of Classification Search

None

See application file for complete search history.

(56) References Cited

U.S. PATENT DOCUMENTS

| | | | | |
|---|---|---|---|---|
| 10,377,002 | B2 * | 8/2019 | Mori | B23P 23/04 |
| 10,675,705 | B2 * | 6/2020 | Mezawa | B23K 26/0093 |
| 10,864,601 | B2 * | 12/2020 | Mezawa | B23K 26/34 |
| 11,173,662 | B2 * | 11/2021 | Fujishima | B33Y 10/00 |
| 2005/0266974 | A1 * | 12/2005 | Yamazaki | B23K 26/1482 483/16 |
| 2007/0271757 | A1 * | 11/2007 | Nagahama | B23K 26/0853 483/19 |
| 2008/0053975 | A1 * | 3/2008 | Yamazaki | B23K 26/1482 219/121.78 |
| 2019/0151990 | A1 | 5/2019 | Mezawa et al. | |

(Continued)

FOREIGN PATENT DOCUMENTS

| | | | | |
|---|---|---|---|---|
| EP | 1894666 | A2 * | 3/2008 | B23K 26/1482 |
| EP | 3363587 | A1 * | 8/2018 | B22F 3/24 |

(Continued)

OTHER PUBLICATIONS

Translation of JP-2017189843-A (Year: 2017).*

*Primary Examiner* — Jacob J Cigna

(74) *Attorney, Agent, or Firm* — IP Business Solutions, LLC.

(57) ABSTRACT

A processing machine includes: a cover body that forms a machining area, and a storage area separated from machining area; an additive manufacturing head; and a head stocker. The additive manufacturing head performs additive manufacturing on a workpiece in machining area. Head stocker stores additive manufacturing head in storage area. Head stocker includes: a head holding part that holds the additive manufacturing head; and a swing mechanism part that swings head holding part centered on a predetermined axis.

11 Claims, 19 Drawing Sheets

(56) References Cited

U.S. PATENT DOCUMENTS

| | | | | |
|---|---|---|---|---|
| 2023/0264295 | A1* | 8/2023 | Kondo | B22F 10/28 219/121.75 |
| 2024/0246174 | A1* | 7/2024 | Otawa | B23P 23/04 |

FOREIGN PATENT DOCUMENTS

| | | | | | |
|---|---|---|---|---|---|
| JP | 5940712 | B1 | * | 6/2016 | B22F 12/22 |
| JP | 2017001078 | A | * | 1/2017 | B33Y 40/00 |
| JP | 2017189843 | A | * | 10/2017 | |
| JP | 6850934 | B1 | * | 3/2021 | B33Y 30/00 |
| WO | 2016203823 | A1 | | 12/2016 | |

* cited by examiner

WORK MACHINE

TECHNICAL FIELD

The present invention relates to a work machine.

BACKGROUND ART

For example, Japanese Patent Laying-Open No. 2017-1078 (PTL 1) discloses a processing machine that includes: a tool spindle that holds a tool for a subtractive manufacturing for a workpiece; an additive manufacturing head that is detachably attached to the tool spindle, and discharges material powder and emits laser light during additive manufacturing for a workpiece; and a head stocker that stores the additive manufacturing head outside of a machining area.

According to the processing machine disclosed in PTL 1, when the additive manufacturing head is attached to the tool spindle, the tool spindle is moved to approach a head stocker door, with a posture where the spindle end face faces downward. Next, by bringing the head stocker door into an open state, the inside of the machining area and the outside of the machining area are caused to communicate with each other. Next, the additive manufacturing head held in the head stocker is caused to proceed into the machining area. The tool spindle is moved to approach the additive manufacturing head, and the additive manufacturing head is clamped by the tool spindle.

CITATION LIST

Patent Literature

PTL 1: Japanese Patent Laying-Open No. 2017-1078

SUMMARY OF INVENTION

Technical Problem

In the processing machine disclosed in PTL 1 described above, the additive manufacturing head maintains the posture allowing delivery between the inside and outside of the machining area, and is stored outside of the machining area by the head stocker. In this case, the additive manufacturing head cannot be changed to take a posture suitable for being stored outside of the machining area, and limitation on design for the processing machine possibly occurs.

Accordingly, an object of the present invention is to solve the problem described above, and provide a work machine that can change the posture of a work head to that suitable for being stored when the work head is temporarily stored.

Solution to Problem

A work machine according to the present invention includes a cover body that forms a first space, and a second space separated from the first space; a work head; and a head stocker. The work head performs work on a workpiece in the first space. The head stocker stores the work head in the second space. The head stocker includes: a head holding part that holds the work head; and a swing mechanism part that swings the head holding part centered on a predetermined axis.

According to the work machine configured as described above, the head holding part is swung centered on the predetermined axis by the swing mechanism part, which can change the work head to take a posture suitable for being stored in the second space.

Preferably, the work machine further includes a tool holding part that is movably provided in the first space, and holds a tool for subtractive manufacturing for a workpiece. The work head is detachably attached to the tool holding part.

According to the work machine configured as described above, by attaching the work head to the tool holding part, the work head can be moved in the first space.

Preferably, the swing mechanism part: swings the head holding part so that the work head held by the head holding part takes a first posture, when the work head is delivered to the head holding part in the first space; and swings the head holding part so that the work head held by the head holding part takes a second posture, when the work head is stored in the second space. The predetermined axis is in parallel with a horizontal direction.

According to the work machine configured as described above, by swinging the head holding part centered on the predetermined axis in parallel with the horizontal direction, the work head can be changed between the first posture suitable for delivery to the head holding part in the first space, and the second posture suitable for being stored in the second space.

Preferably, a lowermost part of the work head with the second posture is disposed above the lowermost part of the work head with the first posture.

According to the work machine configured as described above, the work head can be stored in a higher position in the second space.

Preferably, an entire length in a vertical direction of the work head with the second posture is smaller than the entire length in the vertical direction of the work head with the first posture.

According to the work machine configured as described above, the second space can be configured to be compact in the vertical direction.

Preferably, the head stocker further includes a base that is provided in the second space, and mounts the head holding part and the swing mechanism part.

According to the work machine configured as described above, the assembly capability and/or the maintenance capability of the head stocker can be improved.

Preferably, the head stocker further includes a linear motion mechanism part that is mounted on the base, and moves the head holding part back and forth between the first space and the second space by linearly moving the head holding part in a horizontal direction.

According to the work machine configured as described above, the assembly capability and/or the maintenance capability of the head stocker can be further improved. The linear movement direction of the head holding part by the linear motion mechanism part is the horizontal direction. Accordingly, the second space can be configured to be compact in the vertical direction.

Preferably, the work head includes a head main body held by the head holding part, and a cable extending from the head main body. The head stocker further includes a cable support part that is mounted on the base, and supports the cable.

According to the work machine configured as described above, the assembly capability and/or the maintenance capability of the head stocker can be further improved.

Preferably, the work machine further includes a head stocker support part that supports the base slidably in a horizontal direction between the second space and an external space outside of the cover body.

According to the work machine configured as described above, the head holding part and the swing mechanism part can be pulled out collectively with the base to the external space outside of the cover body. Accordingly, the maintenance capability of the head stocker can be further improved.

Preferably, the work head includes a head main body held by the head holding part, and a cable extending from the head main body. The cover body includes: an inner cover provided with an opening part that causes the first space and the second space to communicate with each other; and a first opening and closing cover and a second opening and closing cover that are provided at the opening part, and allow an opening and closing operation. When the work head performs work on the workpiece in the first space, the first opening and closing cover is brought into a closed state, and the second opening and closing cover is brought into an open state, thus allowing the cable to be pulled out from the first space into the second space through the opening part. When the work head is delivered to the head holding part in the first space, the first opening and closing cover and the second opening and closing cover are brought into the open state, thus allowing the work head to be moved between the first space and the second space through the opening part. When the work head is stored in the second space, the first opening and closing cover and the second opening and closing cover are brought into the closed state, thus separating the first space and the second space from each other.

According to the work machine configured as described above, when the work head performs work on the workpiece in the first space, the first opening and closing cover is in the closed state. Accordingly, the opening area of the opening part can be reduced in comparison with a case where a single opening and closing cover is provided, and the opening and closing cover is in the open state. Accordingly, foreign substances can be prevented from entering the second space from the first space.

When the work head is delivered to the head holding part in the first space, the first opening and closing cover and the second opening and closing cover are brought into the open state. Accordingly, the opening area of the opening part required to move the work head between the first space and the second space can be secured.

When the work head is stored in the second space, the first opening and closing cover and the second opening and closing cover are brought into the closed state. Accordingly, foreign substances can be prevented from entering the second space from the first space.

Preferably, the work machine further includes a workpiece spindle, a tailstock, or a workpiece steady rest that is provided below the work head stored in the second space.

According to the work machine configured as described above, the head holding part is swung centered on the predetermined axis by the swing mechanism part, which can change the work head to take a posture that does not interfere with the workpiece spindle, the tailstock, or the workpiece steady rest.

Preferably, the work head is an additive manufacturing head that emits laser light while supplying material powder to the workpiece.

According to the work machine configured as described above, the head holding part is swung centered on the predetermined axis by the swing mechanism part, which can change the additive manufacturing head to take a posture suitable for being stored in the second space.

Advantageous Effect of Invention

As described above, according to the present invention, the work machine that can change the posture of the work head to that suitable for being stored when the work head is temporarily stored can be provided.

DESCRIPTION OF EMBODIMENTS

Figure 1:
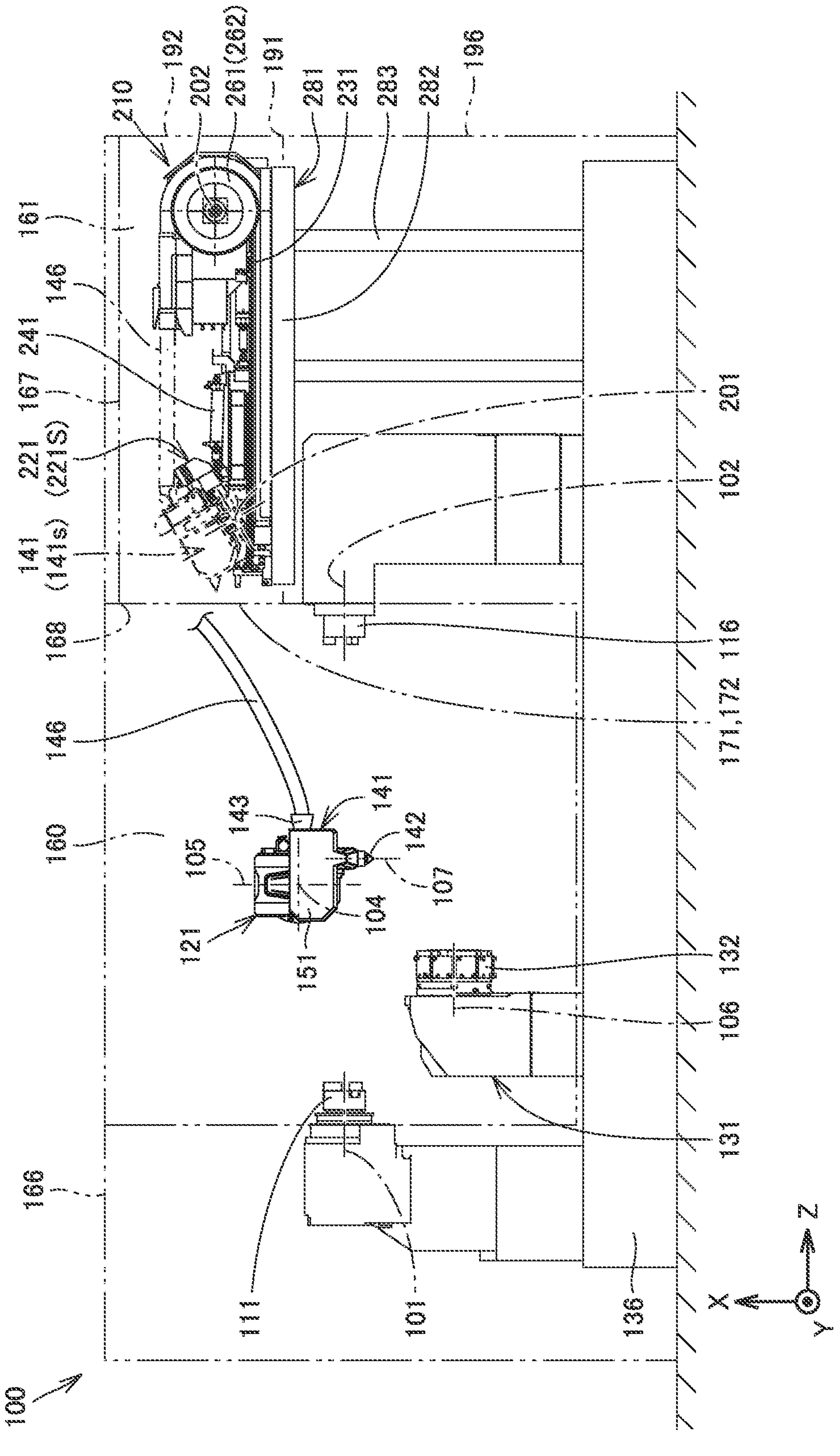
FIG. 1 is a front view showing a processing machine in an embodiment of the present invention.

Referring to the drawings, embodiments of the present invention are described. Note that in the drawings to be referred to below, the identical or equivalent members are assigned the same numbers.

FIG. 1 is a front view showing a processing machine in an embodiment of the present invention. In FIG. 1, with a transparent view through a cover body forming an appearance of the processing machine, the inside of the processing machine is shown.

Referring to FIG. 1, a processing machine 100 is an AM/SM hybrid processing machine capable of additive manufacturing processing for a workpiece and subtractive manufacturing processing (cutting machining) for a workpiece. Processing machine 100 has a turning function using a fixed tool, and a milling function using a rotating tool, as SM processing functions.

Processing machine 100 is an NC (Numerically Controlled) processing machine where various operations for workpiece processing are automated by numerical control by a computer.

Note that in this Description, an axis that is in parallel with the lateral direction (width direction) of processing machine 100 and extends in the horizontal direction is called "Z-axis", an axis that is in parallel with the front-back direction (depth direction) of processing machine 100 and extends in the horizontal direction is called "Y-axis", and an axis extending in the vertical direction is called "X-axis". The X-axis, the Y-axis, and the Z-axis are three axes that are orthogonal to each other. The right direction in FIG. 1 is called "+Z-axis direction", and the left direction is called "−Z-axis direction". The front direction on the sheet of FIG. 1 is called "+Y-axis direction", and the depth direction is called "−Y-axis direction". The upper direction in FIG. 1 is called "+X-axis direction", and the lower direction is called "−X-axis direction".

First, the entire structure of processing machine 100 is described. Processing machine 100 includes a cover body 166. Cover body 166 forms a machining area 160 and a storage area 161, and presents an appearance of the processing machine 100.

Machining area 160 is a space in which a workpiece is processed, and is hermetically closed so as to prevent chips and coolant (mist) accompanying the subtractive manufacturing for the workpiece and fumes accompanying the additive manufacturing for the workpiece from leaking to the outside of machining area 160.

Processing machine 100 includes a bed 136, a first workpiece spindle 111, a second workpiece spindle 116, a tool spindle 121, and a tool rest 131.

Bed 136 is a base member for supporting first workpiece spindle 111, second workpiece spindle 116, tool spindle 121, tool rest 131 and the like, and is installed on a floor surface of a factory or the like.

First workpiece spindle 111 and second workpiece spindle 116 are arranged opposite to each other in the Z-axis direction. The workpiece spindles that are first workpiece spindle 111 and second workpiece spindle 116 can hold a workpiece. Each of the workpiece spindles that are first workpiece spindle 111 and second workpiece spindle 116 are provided with a chuck mechanism (not shown) for detachably holding a workpiece. First workpiece spindle 111 rotates a held workpiece centered on a rotation central axis 101 in parallel with the Z-axis. Second workpiece spindle 116 rotates a held workpiece centered on a rotation central axis 102 in parallel with the Z-axis.

First workpiece spindle 111 is fixed to bed 136. Second workpiece spindle 116 is movable in the Z-axis direction by any of various feeding mechanisms, guide mechanisms, servomotors and the like. Second workpiece spindle 116 may have a configuration fixed to bed 136.

Note that instead of second workpiece spindle 116, a tailstock for supporting the rotation center of a workpiece held at first workpiece spindle 111 may be provided, or a workpiece steady rest for supporting the workpiece held at first workpiece spindle 111 from the outer periphery and for preventing the workpiece from oscillating.

Tool spindle 121 is provided in machining area 160. Tool spindle 121 can hold a tool for the subtractive manufacturing for a workpiece. Tool spindle 121 can hold a rotating tool for a workpiece milling process. Tool spindle 121 is provided with a tool clamp mechanism (not shown) for detachably holding a tool. When the workpiece milling process is performed using the rotating tool, tool spindle 121 rotates the held rotating tool centered on a rotation central axis 105 in parallel with the X- and Z-axes plane.

Furthermore, tool spindle 121 can swing (B-axis swing) centered on a swing central axis 104 in parallel with the horizontal direction. Swing central axis 104 is in parallel with the Y-axis. Preferably, the swing range of tool spindle 121 is +90° or more with respect to a reference posture (posture shown in FIG. 1) where a spindle end face 123 (see FIG. 8 and the like described later) of tool spindle 121 is oriented downward. The swing range of tool spindle 121 may be a range of +90° with respect to the reference posture, or a range of +120°.

Tool spindle 121 is supported above bed 136 by a column or the like, not shown. Tool spindle 121 is movable in the X-axis direction, the Y-axis direction, and the Z-axis direction by various feeding mechanisms, guide mechanisms, servomotors and the like provided at the column or the like. The processing position by the rotating tool attached to tool spindle 121 is three-dimensionally moved.

Although not shown in FIG. 1, around first workpiece spindle 111 there are provided an automatic tool changer (ATC) for automatically changing a tool held by tool spindle 121, and a tool magazine that stores tools that are each to be replaced and held by tool spindle 121.

A plurality of fixed tools for a turning process are attached to tool rest 131. The tool rest 131 has what is called a turret shape, allows the fixed tools to be radially attached thereto, and performs swing division.

More specifically, tool rest 131 includes a swing part 132. Swing part 132 can swing centered on a swing central axis 106 in parallel with the Z-axis. At a position apart by a gap in the circumferential direction centered on swing central axis 106, a tool holder for holding the fixed tool is attached. By rotation of swing part 132 centered on swing central axis 106, the fixed tool held by the tool holder moves in the circumferential direction, and the fixed tool used for the turning process is divided. Tool rest 131 is supported above bed 136 by a saddle or the like, not shown.

Tool rest 131 is movable in the X-axis direction and the Z-axis direction by various feeding mechanisms, guide mechanisms, servomotors and the like provided at the saddle or the like. Tool rest 131 may have a milling function of rotating the rotating tool.

Processing machine 100 further includes an additive manufacturing head 141, a powder feeder and a laser oscillating device (not shown), and a cable 146.

Additive manufacturing head 141 performs work on the workpiece. Additive manufacturing head 141 discharges powder (material powder) to the workpiece, and emits laser light, thereby performing the additive manufacturing (directed energy deposition method). Metal powder, such as of stainless steel, nickel-based alloy, cobalt-base alloy, or titanium, may be used as the powder. Note that the powder is not necessarily metal powder.

Additive manufacturing head 141 is detachably provided for tool spindle 121. Tool spindle 121 and additive manufacturing head 141 are provided with a connection mechanism (not shown) for connecting tool spindle 121 and additive manufacturing head 141 to each other. The connection mechanism may include a pin fitting structure, or a clamp structure using a spring force and/or hydraulic pressure. The connection mechanism may use a tool clamp mechanism provided for tool spindle 121.

In the additive manufacturing for a workpiece, additive manufacturing head 141 is attached to tool spindle 121, is thus integrated with tool spindle 121, moves in the X-axis direction, the Y-axis direction, and the Z-axis direction, and swings centered on swing central axis 104. In the subtractive manufacturing for a workpiece, additive manufacturing head 141 is separated from tool spindle 121, and is stored in storage area 161 by a head stocker 210 described later.

Note that additive manufacturing head 141 may have a configuration of being detachably provided for a movement mechanism provided separately from tool spindle 121. In the additive manufacturing for a workpiece, additive manufacturing head 141 is attached to the movement mechanism, and thus moves in machining area 160, while tool spindle 121 stands by at a corner part of machining area 160.

The powder feeder and the laser oscillating device are provided outside of processing machine 100. The powder feeder feeds powder to be used for the additive manufacturing, toward additive manufacturing head 141. The laser oscillating device oscillates laser light to be used for the additive manufacturing.

Cable 146 extends from additive manufacturing head 141, and is connected to the powder feeder and the laser oscillating device. Cable 146 supplies powder from the powder feeder to additive manufacturing head 141, and supplies laser light from the laser oscillating device to additive manufacturing head 141. Cable 146 includes an optical fiber for guiding laser light, a pipe for guiding powder, an air tube serving as a flow path of air, a gas pipe serving as a flow path of inert gas, a cooling pipe serving as a flow path of refrigerant, electrical wiring, and a flexible tube that stores them. Cable 146 has flexibility.

Additive manufacturing head 141 includes a head main body 151, and a laser tool 142. Cable 146 extends from head main body 151. Laser light and powder are introduced into head main body 151 through cable 146. Head main body 151 internally includes various optical components, such as mirrors for guiding the laser light toward laser tool 142, and a collimating lens for converting the laser light into parallel light.

Head main body 151 is provided with a first cable guide part 143. First cable guide part 143 has a cylindrical shape, and allows cable 146 to be inserted therein. First cable guide part 143 guides cable 146 into head main body 151.

Laser tool 142 is attached to head main body 151. Laser tool 142 emits laser light toward the workpiece, and defines a laser light irradiation region on the workpiece. Laser tool 142 may include a condenser lens. An optical axis 107 of laser light emitted from laser tool 142 toward the workpiece extends in parallel with rotation central axis 105 of tool spindle 121. Laser tool 142 is provided with a nozzle hole for discharging powder toward the workpiece. Note that additive manufacturing head 141 may have a configuration of discharging powder through a nozzle having a pipe shape.

Processing machine 100 may include a plurality of laser tools 142 that have varying shapes and/or sizes of laser light irradiation regions defined on the workpiece. In this case, any one laser tool 142 may be selected among laser tools 142 in accordance with a condition of additive manufacturing to be executed, and be attached to head main body 151.

Storage area 161 is provided in the Z-axis direction alongside machining area 160. Storage area 161 is provided above second workpiece spindle 116.

Cover body 166 further includes an inner cover 167, a first opening and closing cover 171, and a second opening and closing cover 172.

Inner cover 167 is provided above second workpiece spindle 116. Inner cover 167 forms storage area 161. Inner cover 167 is provided with an opening part 168. Opening part 168 is made up of an opening that causes machining area 160 and storage area 161 to communicate with each other. First opening and closing cover 171 and second opening and closing cover 172 are provided at opening part 168. Each of the opening and closing covers that are first opening and closing cover 171 and second opening and closing cover 172 is provided to be movable between a closed state in which opening part 168 is blocked and an open state in which opening part 168 is opened.

Note that the structures of inner cover 167, first opening and closing cover 171, and second opening and closing cover 172 are described in detail later.

Processing machine 100 further includes head stocker 210, and a head stocker support part 281.

Head stocker 210 is provided in storage area 161. Head stocker support part 281 is provided to stand on bed 136. Head stocker 210 is supported above second workpiece spindle 116 by head stocker support part 281. In the subtractive manufacturing for a workpiece, head stocker 210 stores additive manufacturing head 141 in storage area 161.

Figure 2:
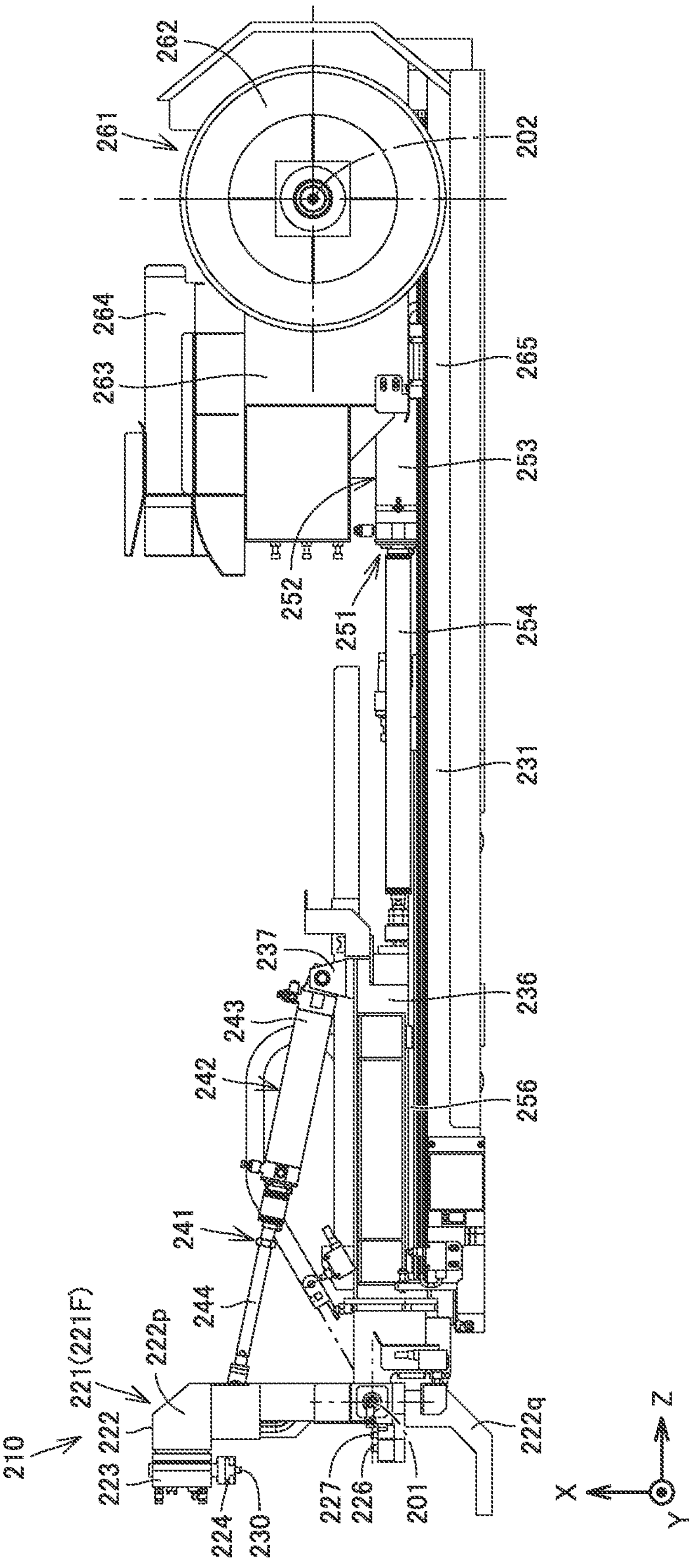
FIG. 2 is a front view showing a head stocker (a first state of a head holding part) in FIG. 1.
Figure 3:
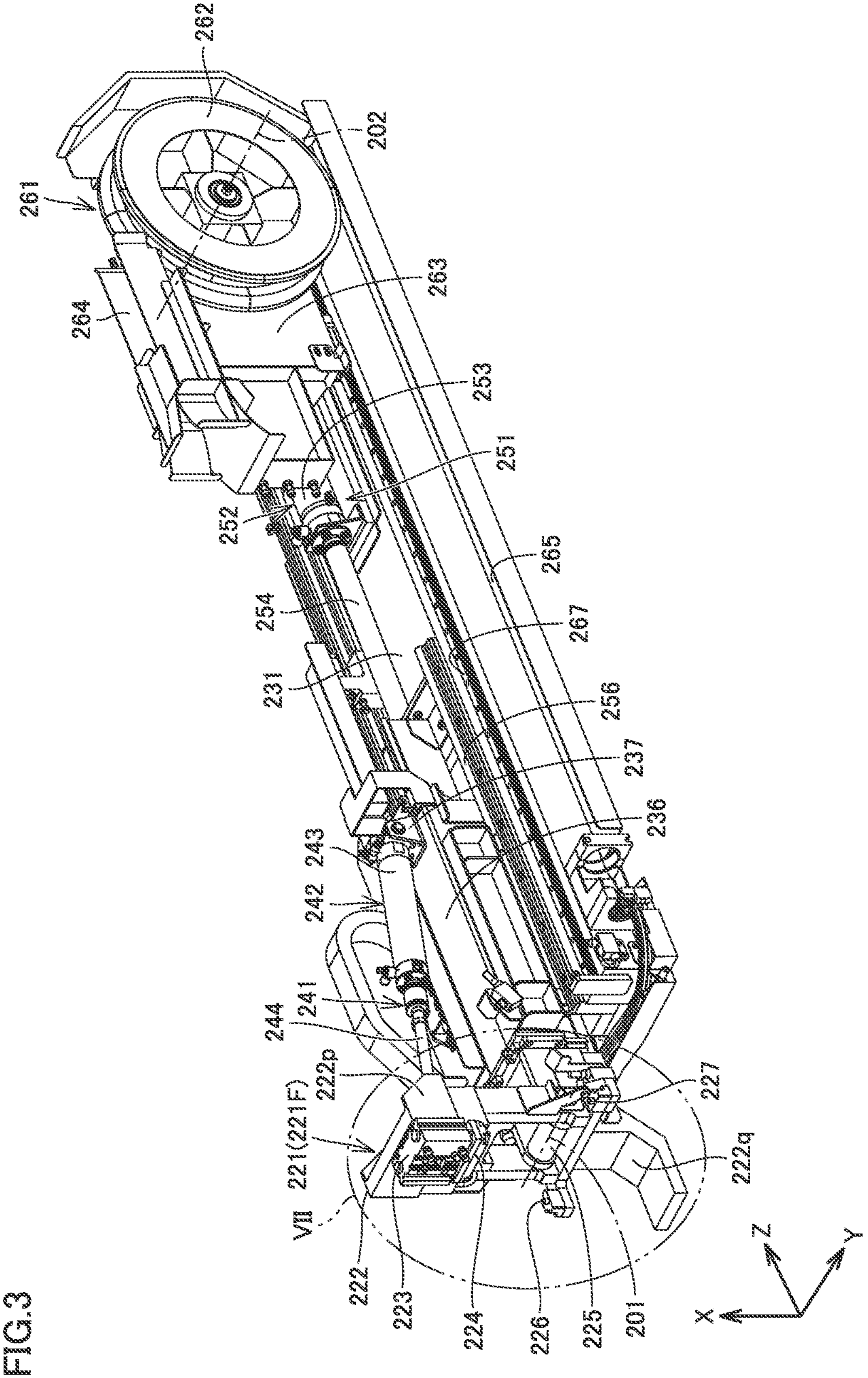
FIG. 3 is a perspective view showing the head stocker (the first state of the head holding part) in FIG. 1.
Figure 4:
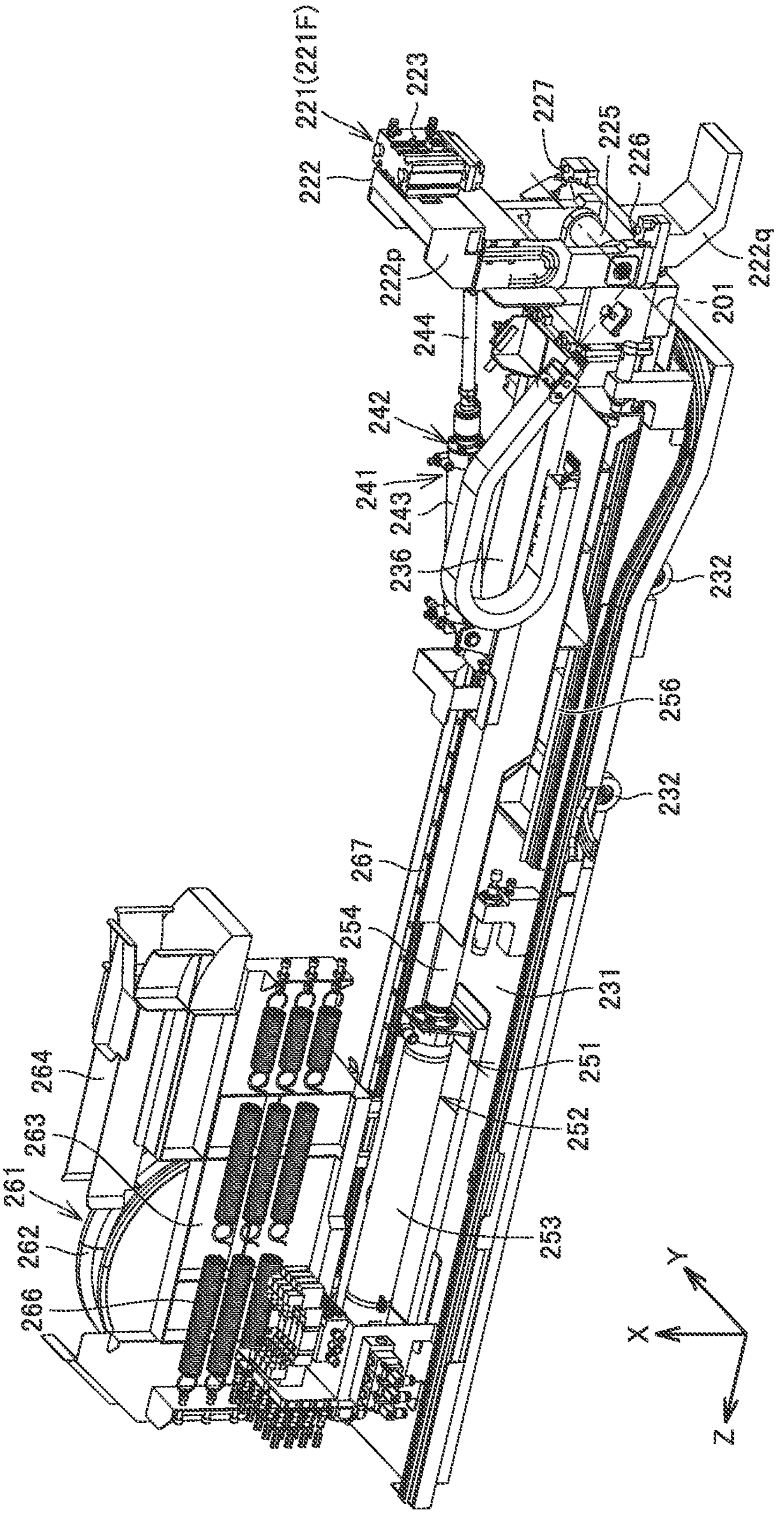
FIG. 4 is another perspective view showing the head stocker (the first state of the head holding part) in FIG. 1.
Figure 5:
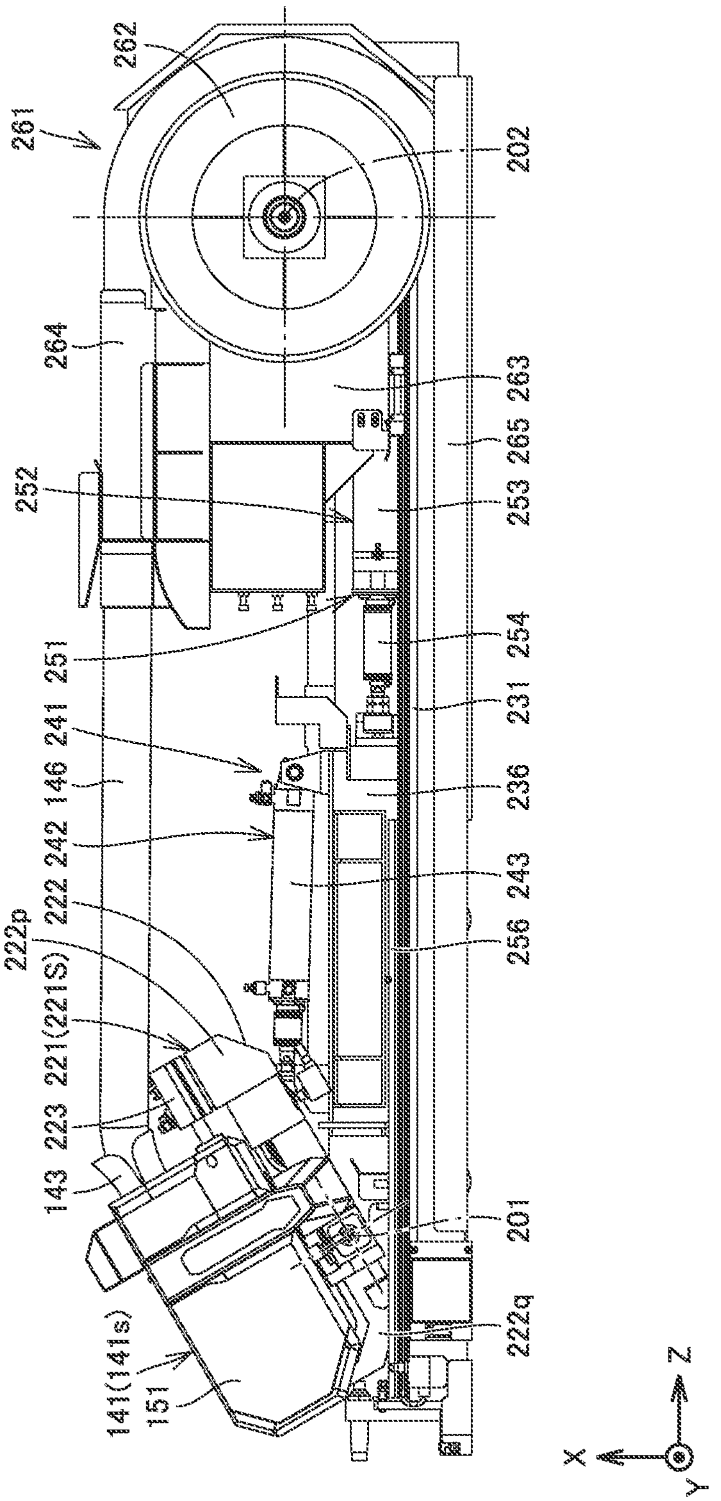
FIG. 5 is a front view showing the head stocker (a second state of the head holding part) in FIG. 1.
Figure 6:
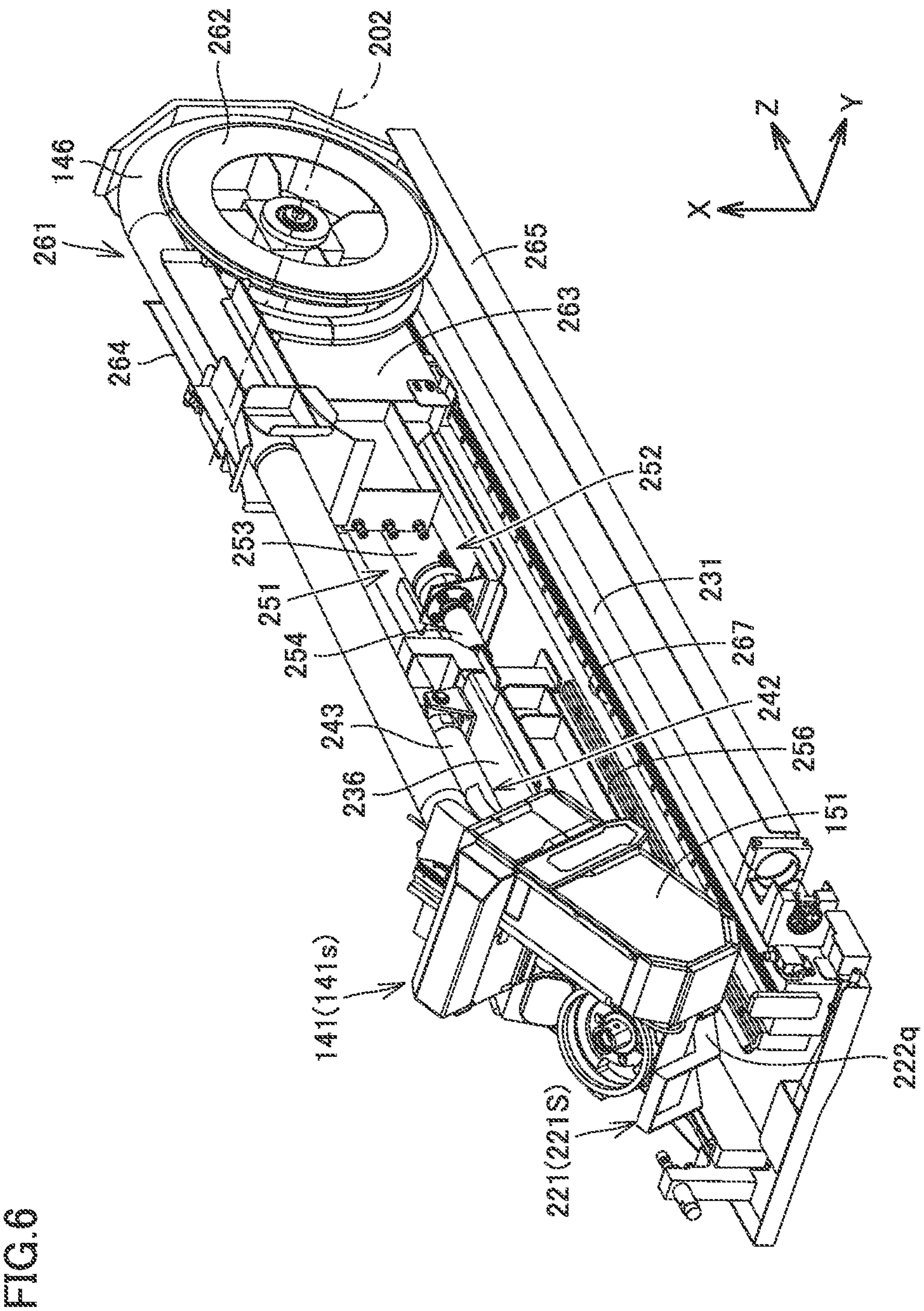
FIG. 6 is a perspective view showing the head stocker (the second state of the head holding part) in FIG. 1.
Figure 7:
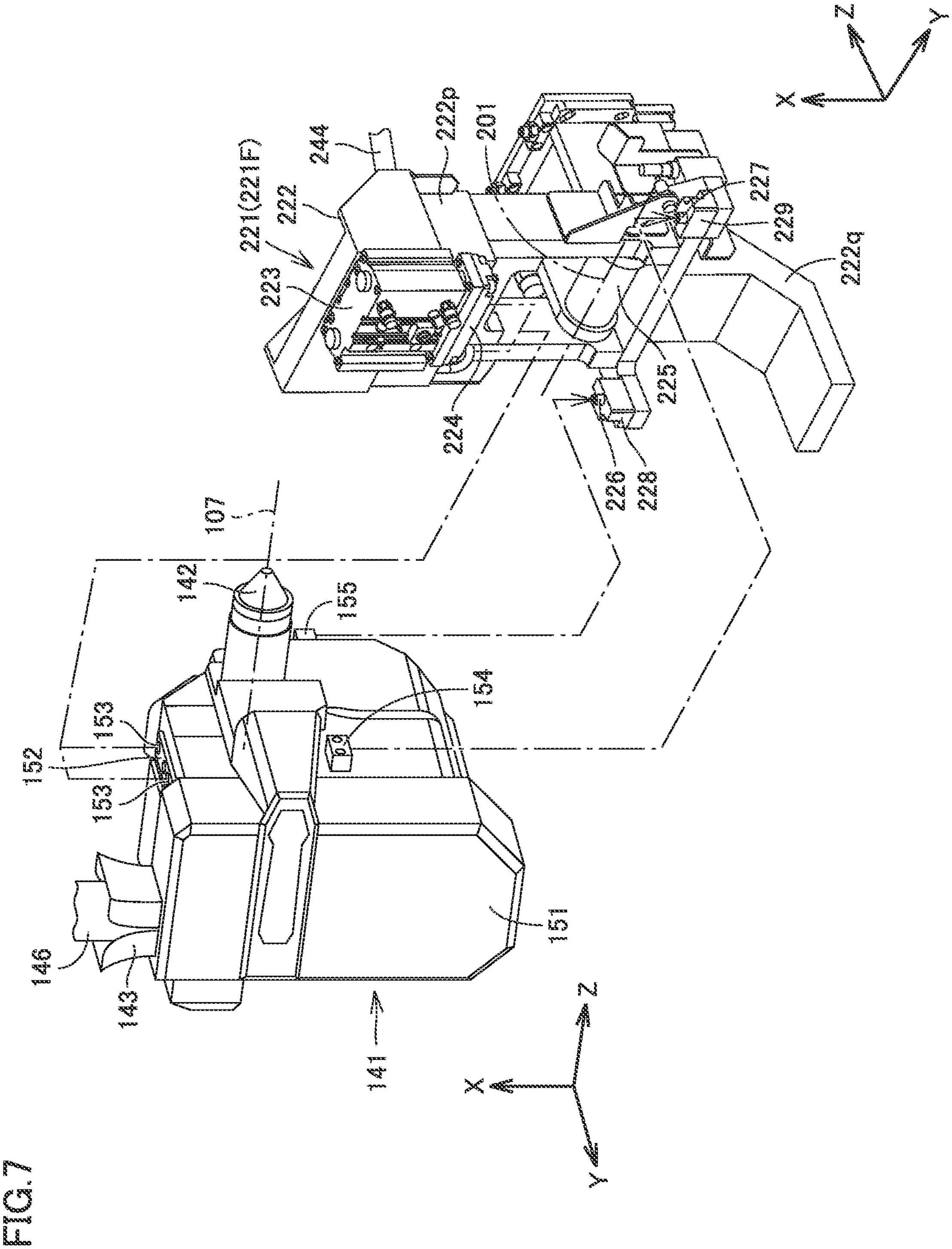
FIG. 7 is a perspective view for illustrating a holding structure for an additive manufacturing head by the head holding part.

Subsequently, a more specific structure of head stocker 210 is described. FIG. 2 is a front view showing the head stocker (a first state of the head holding part) in FIG. 1. FIG. 3 is a perspective view showing the head stocker (the first state of the head holding part) in FIG. 1. FIG. 4 is another perspective view showing the head stocker (the first state of the head holding part) in FIG. 1. FIG. 5 is a front view showing the head stocker (a second state of the head holding part) in FIG. 1. FIG. 6 is a perspective view showing the head stocker (the second state of the head holding part) in FIG. 1. FIG. 7 is a perspective view illustrating a holding structure for the additive manufacturing head by the head holding part.

Referring to FIGS. 1 to 7, head stocker 210 includes a base 231, a head holding part 221, and a swing mechanism part 241.

Bed 231 is made up of a plate member disposed in parallel with Y- and Z-axes plane. Base 231 mounts head holding part 221 and swing mechanism part 241. Base 231 is further mounted with a linear motion mechanism part 251 and a cable support part 261, which are described later.

Head holding part 221 holds additive manufacturing head 141. Head holding part 221 detachably holds additive manufacturing head 141.

Swing mechanism part 241 swings head holding part 221 centered on a predetermined axis 201. Predetermined axis 201 extends in the horizontal direction. Predetermined axis 201 extends in the Y-axis direction. Swing mechanism part 241 swings head holding part 221 between a first state 221F shown in FIGS. 2 to 4 and a second state 221S shown in FIGS. 5 and 6.

Head holding part 221 includes frames 222 and a shaft part 225. Frames 222 serve as a framework of head holding part 221. Frames 222 allow predetermined axis 201 to intervene therebetween and extend on both the sides. Shaft part 225 extends axially on predetermined axis 201. Shaft part 225 is connected to a first slide member 236, described later, so as to be rotatable centered on predetermined axis 201.

Frames 222 include an upper frame part 222*p*, and a lower frame part 222*q*. When head holding part 221 is brought into first state 221F, upper frame part 222*p* extends upward (+X-axis direction) from predetermined axis 201 (shaft part 225). Lower frame part 222*q* extends downward (−X-axis direction) from predetermined axis 201 (shaft part 225), and is then bent and extends in the horizontal direction (−Z-axis direction).

In accordance with the swing operation of head holding part 221 from first state 221F to second state 221S, frames 222 are tilted centered on predetermined axis 201 (shaft part 225). When head holding part 221 is brought into second state 221S, upper frame part 222*p* extends in an obliquely upper direction (+X-axis direction and +Z-axis direction) from predetermined axis 201 (shaft part 225). Lower frame part 222*q* extends in an obliquely downward direction (−X-axis direction and −Z-axis direction) from predetermined axis 201 (shaft part 225), and is then bent and extends in an obliquely upward direction (+X-axis direction and −Z-axis direction).

As shown in FIG. 7, when additive manufacturing head 141 is attached to or detached from head holding part 221, head holding part 221 is in first state 221F, additive manufacturing head 141 is in a state where optical axis 107 extends in the Z-axis direction, and laser tool 142 faces head holding part 221 in the Z-axis direction.

Head holding part 221 further includes first actuator 223, a plurality of first pin members 230 (see FIG. 2), a second pin member 226, and a third pin member 227.

First actuator 223 is attached to upper frame part 222*p*. First actuator 223 is provided at a position opposite to lower frame part 222*q* in a direction orthogonal to predetermined axis 201. First actuator 223 is made up of a piston cylinder. First actuator 223 is air type one. First actuator 223 includes a piston that performs extension and contraction operation in the vertical direction (X-axis direction).

Multiple first pin members 230 are attached to the piston of first actuator 223 via a plate member 224. Multiple first pin members 230 are provided so as to extend downward (−X-axis direction) from plate member 224. Multiple first pin members 230 are provided at intervals in the Y-axis direction.

Second pin member 226 is attached to lower frame part 222*q* via a plate member 228. Second pin member 226 is provided so as to extend upward (+X-axis direction) from plate member 228. Third pin member 227 is attached to lower frame part 222*q* via a plate member 229. Third pin member 227 is provided so as to extend upward (+X-axis direction) from plate member 229.

Additive manufacturing head 141 further includes a first block 152, a second block 155, and a third block 154. First block 152, second block 155, and third block 154 are attached to head main body 151.

The first block 152 is provided with a plurality of first pin insertion holes 153. A plurality of first second pin insertion holes 153 extend in the X-axis direction, and are open upward (+X-axis direction). The second block 155 and the third block 154 are respectively provided with second pin insertion holes and third pin insertion holes (not shown). Each of pin insertion holes that are the second pin insertion holes and the third pin insertion holes extends in the X-axis direction and is open downward (−X-axis direction).

When additive manufacturing head 141 is attached to head holding part 221, in accordance with movement of additive manufacturing head 141 in the −X-axis direction, second pin member 226 is inserted into the second pin insertion hole provided in second block 155, and third pin member 227 is inserted into the third pin insertion hole provided in third block 154. In accordance with expansion driving by first actuator 223, multiple first pin members 230 are inserted respectively into first pin insertion holes 153, thus allowing additive manufacturing head 141 to be held by head holding part 221.

On the other hand, when additive manufacturing head 141 is separated from head holding part 221, in accordance with contract driving by first actuator 223, multiple first pin members 230 are pulled out respectively from first pin insertion holes 153. As additive manufacturing head 141 moves in the +X-axis direction, second pin member 226 is pulled out from the second pin insertion hole provided in second block 155, and third pin member 227 is pulled out from the third pin insertion hole provided in third block 154, thus allowing holding of additive manufacturing head 141 by head holding part 221 to be released.

As shown in FIGS. 2 to 6, swing mechanism part 241 includes a second actuator 242. Second actuator 242 is connected to head holding part 221. Second actuator 242 is made up of a piston cylinder. Second actuator 242 is air type one. Second actuator 242 is provided on first slide member 236 described later.

Second actuator 242 includes a cylinder case 243, and a piston 244. Cylinder case 243 is connected to first slide member 236, described later, via a cylinder holding clasp 237. Cylinder case 243 is connected to first slide member 236 rotatably centered on the rotation central axis extending in the Y-axis direction.

Piston 244 is fitted into cylinder case 243. Piston 244 extends obliquely upward (+X-axis direction and −Z-axis direction) from cylinder case 243. Piston 244 is connected to frame 222 (upper frame part 222*p*) of head holding part 221 at a distal end extending from cylinder case 243. Piston 244 is connected to frame 222 rotatably centered on the rotational center axis extending in the Y-axis direction. Piston 244 performs extension and contraction operation in the plane that is the X- and Z-axes plane.

In accordance with expansion driving by second actuator 242, head holding part 221 is swung so as to raise from first slide member 236. Accordingly, head holding part 221 transitions from second state 221S to first state 221F. On the other hand, in accordance with contraction driving by second actuator 242, head holding part 221 is swung so as to upper frame part 222*p* be gotten down toward first slide member 236. Accordingly, head holding part 221 transitions from first state 221F to second state 221S.

Referring to FIGS. 1 to 6, head stocker 210 further includes a linear motion mechanism part 251. Linear motion mechanism part 251 is mounted on base 231. Linear motion mechanism part 251 linearly moves head holding part 221 in the horizontal direction. Linear motion mechanism part 251 slides head holding part 221 in the Z-axis direction. Linear motion mechanism part 251 moves head holding part 221 back and forth between machining area 160 and storage area 161.

Linear motion mechanism part 251 includes first slide member 236, and a third actuator 252. First slide member 236 is provided on base 231. First slide member 236 is supported by a linear guide 256 slidably in the Z-axis direction. A third actuator 252 is connected to first slide member 236. Third actuator 252 is made up of a piston cylinder. Third actuator 252 is air type one. Third actuator 252 is provided on base 231.

Third actuator 252 includes a cylinder case 253, and a piston 254. Cylinder case 253 is supported by base 231. Piston 254 is fitted into cylinder case 253. Piston 254 extends in the −Z-axis direction from cylinder case 253. Piston 254 is connected to first slide member 236 at a distal end extending from cylinder case 253. Piston 254 performs extension and contraction operation in the Z-axis direction.

In accordance with expansion driving of third actuator 252, first slide member 236 slides in the −Z-axis direction together with head holding part 221 and swing mechanism part 241. In accordance with contraction driving of third actuator 252, first slide member 236 slides in the +Z-axis direction together with head holding part 221 and swing mechanism part 241.

Head stocker 210 further includes a cable support part 261. Cable support part 261 supports cable 146. Cable support part 261 is mounted on base 231. Cable support part 261 supports, in storage area 161, cable 146 extending from additive manufacturing head 141.

Cable support part 261 includes a pulley part 262, a second slide member 263, elastic members 266, second cable guide part 264, and a third cable guide part 265.

Pulley part 262 is rotatable centered on a rotation central axis 202 in parallel with the Y-axis direction, and is slidable in the Z-axis direction.

Pulley part 262 is supported by second slide member 263. Second slide member 263 is supported by a linear guide 267 slidably in the Z-axis direction. Second slide member 263 slides at a position deviating in the +Y-axis direction from first slide member 236. Pulley part 262 slides in the Z-axis direction integrally with second slide member 263.

Elastic members 266 apply an elastic force from machining area 160 toward storage area 161, to pulley part 262 (second slide member 263). Elastic members 266 apply, to pulley part 262 (second slide member 263), the elastic force in a direction away from additive manufacturing head 141 in machining area 160 in the Z-axis direction. Elastic members 266 apply the elastic force in the +Z-axis direction to pulley part 262 (second slide member 263).

Elastic members 266 are made up of coil springs. Elastic members 266 extend in the Z-axis direction. Ends of elastic members 266 in the +Z-axis direction are connected to base 231. Ends of elastic members 266 in the −Z-axis direction are connected to second slide member 263.

Cable 146 extending from additive manufacturing head 141 extends in the +Z-axis direction above base 231. Cable 146 is wound around pulley part 262, is inverted by 180°, and extends in the −Z-axis direction. The distal end of cable 146 extending in the −Z-axis direction is supported by base 231.

Each of cable guide parts that are second cable guide part 264 and third cable guide part 265 guides cable 146 in the Z-axis direction. Second cable guide part 264 guides cable 146 immediately before being wound around pulley part 262. Third cable guide part 265 guides cable 146 immediately after being wound around pulley part 262.

Second cable guide part 264 is attached to second slide member 263. Second cable guide part 264 slides with pulley part 262 in the Z-axis direction. Second cable guide part 264 has a groove shape extending in the +Z-axis direction toward an upper end of pulley part 262. Cable 146 extending toward pulley part 262 is inserted into second cable guide part 264.

Third cable guide part 265 is attached to base 231. Third cable guide part 265 has a groove shape extending in the −Z-axis direction toward a lower end of pulley part 262. Cable 146 pulled out from pulley part 262 is inserted into third cable guide part 265.

By cable support part 261 having such a configuration, the deflection of cable 146 in machining area 160 can be prevented. By slide movement of pulley part 262 in the Z-axis direction, the length of cable 146 in machining area 160 can be automatically adjusted in accordance with the position of additive manufacturing head 141.

In this embodiment, base 231 mounded with head holding part 221 is further mounted with swing mechanism part 241, linear motion mechanism part 251, and cable support part 261. By such a configuration, head holding part 221, swing mechanism part 241, linear motion mechanism part 251, and cable support part 261 can be integrally treated. Accordingly, the assembly capability and the maintenance capability of the head stocker 210 can be improved.

FIGS. 8 to 11 are front views showing operations of the tool spindle, the additive manufacturing head, and the head holding part when the additive manufacturing head is attached to and detached from the tool spindle.

Figure 8:
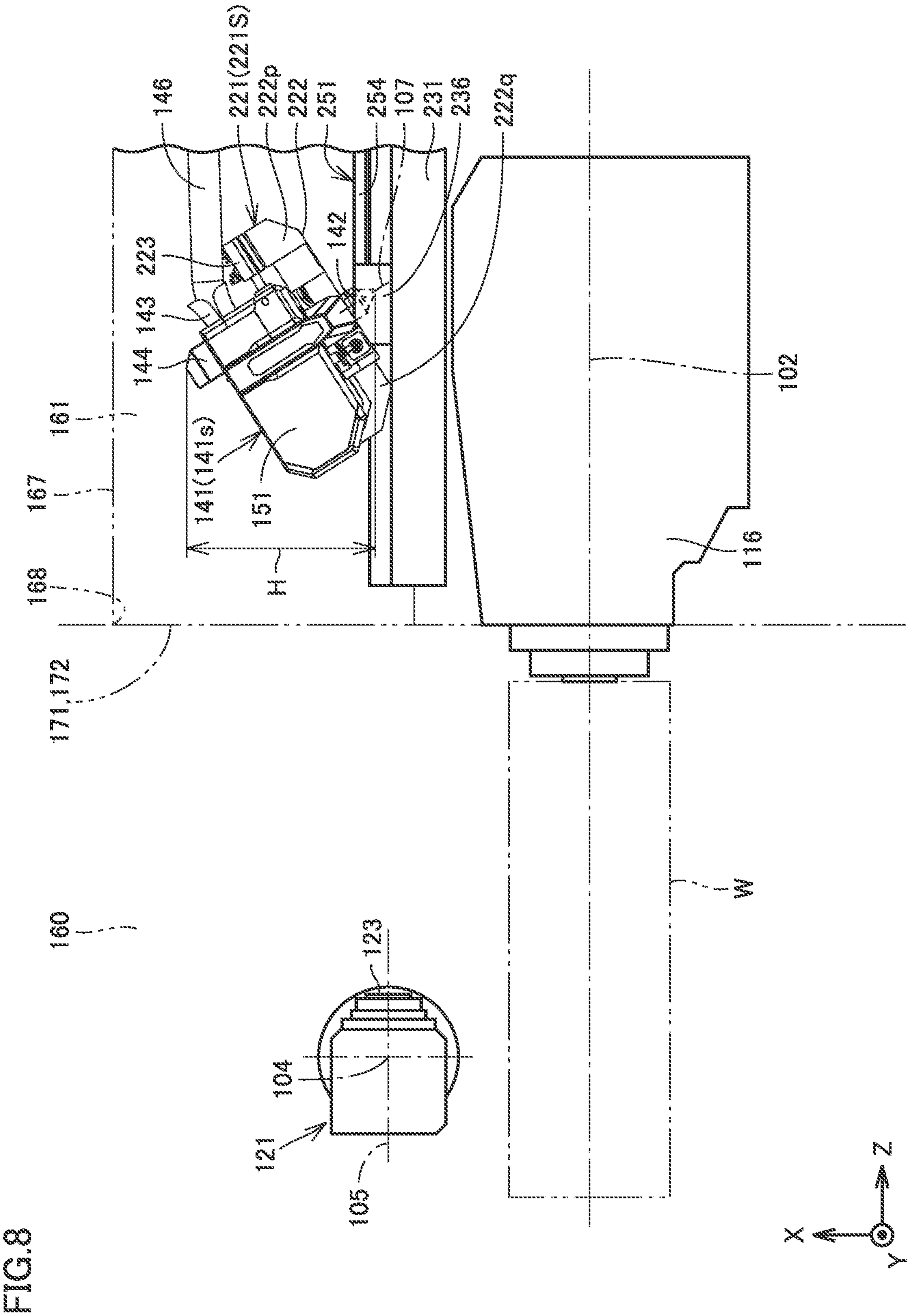
FIG. 8 is a front view showing operations of a tool spindle, the additive manufacturing head, and the head holding part when the additive manufacturing head is attached to and detached from the tool spindle.
Figure 9:
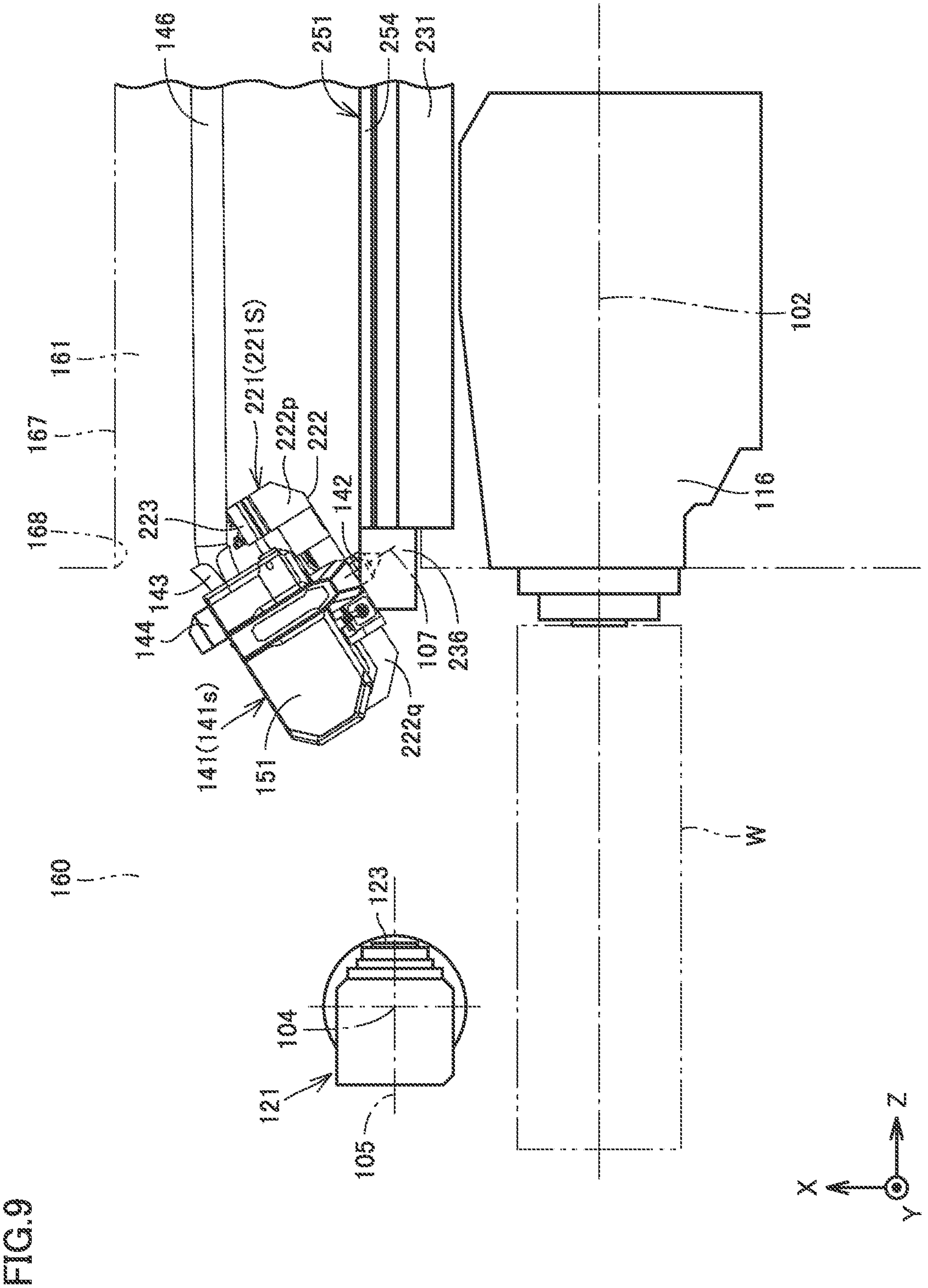
FIG. 9 is another front view showing operations of the tool spindle, the additive manufacturing head, and the head holding part when the additive manufacturing head is attached to and detached from the tool spindle.
Figure 10:
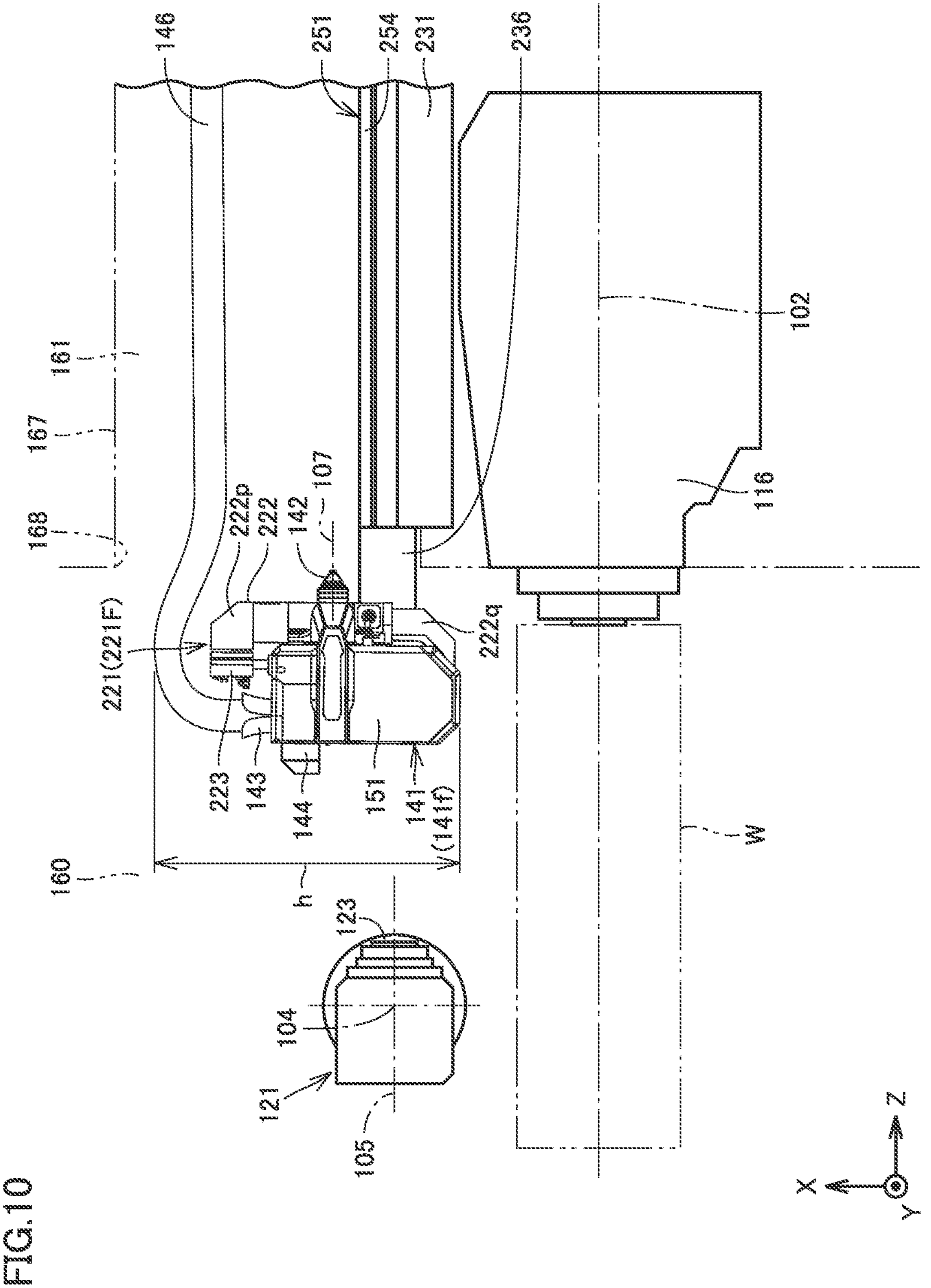
FIG. 10 is still another front view showing operations of the tool spindle, the additive manufacturing head, and the head holding part when the additive manufacturing head is attached to and detached from the tool spindle.
Figure 11:
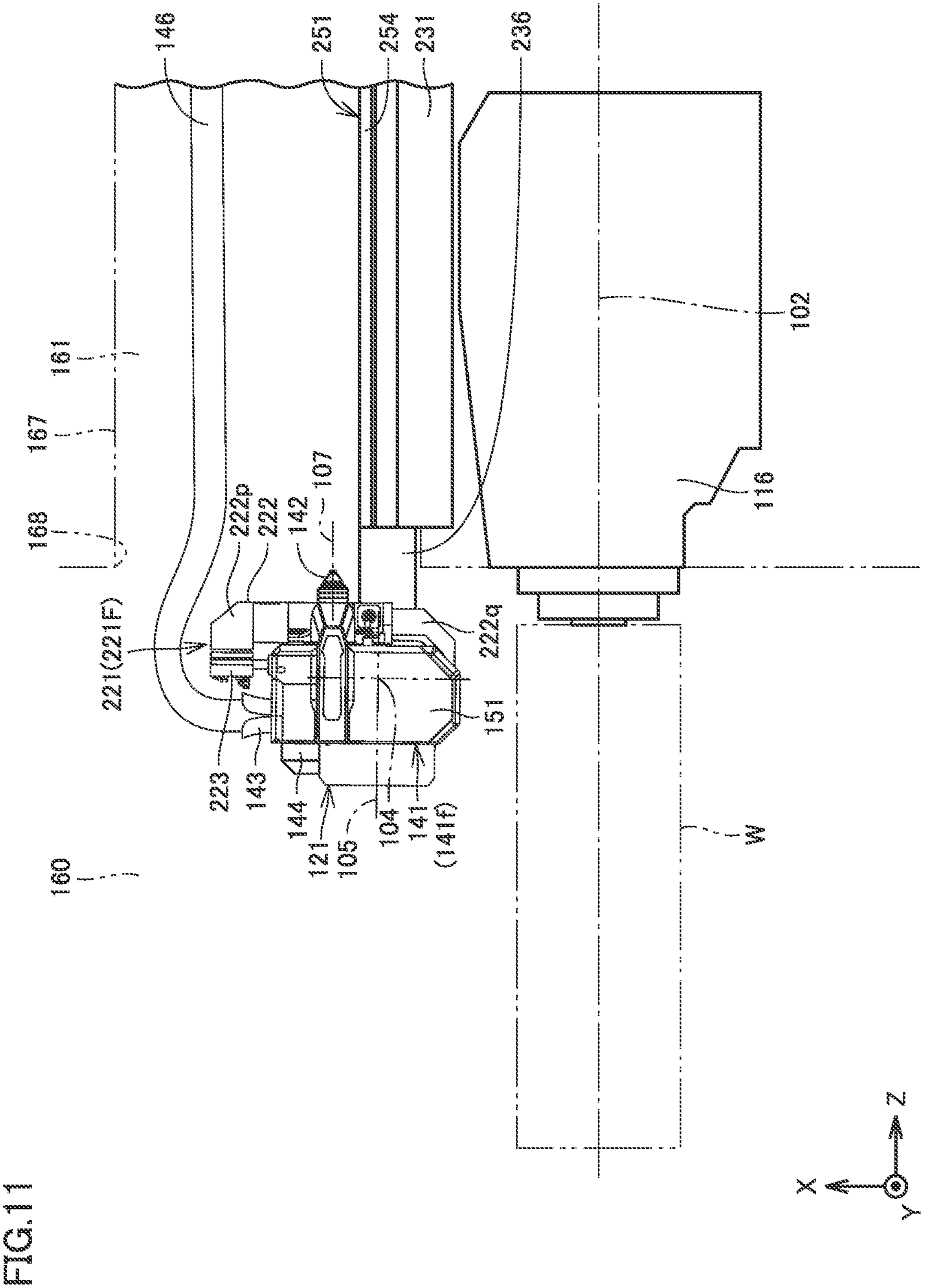
FIG. 11 is yet another front view showing operations of the tool spindle, the additive manufacturing head, and the head holding part when the additive manufacturing head is attached to and detached from the tool spindle.

When additive manufacturing head 141 is attached to tool spindle 121, a step shown in FIG. 8, a step shown in FIG. 9, a step shown in FIG. 10, and a step shown in FIG. 11 are executed sequentially in the listed order. When additive manufacturing head 141 is detached from tool spindle 121, a step shown in FIG. 11, a step shown in FIG. 10, a step shown in FIG. 9, and a step shown in FIG. 8 are executed sequentially in the listed order.

Referring to FIGS. 8 to 11, when workpiece processing in processing machine 100 transitions from subtractive manufacturing to additive manufacturing, additive manufacturing head 141 held in head holding part 221 is moved from storage area 161 to machining area 160, and is attached to tool spindle 121. When the workpiece processing in machining area 160 transitions from the additive manufacturing to the subtractive manufacturing, additive manufacturing head 141 is removed from tool spindle 121, and is held by head holding part 221, and additive manufacturing head 141 held by head holding part 221 is moved from machining area 160 to storage area 161. When in machining area 160 additive manufacturing head 141 is delivered from tool spindle 121 to head holding part 221, swing mechanism part 241 swings head holding part 221 so that additive manufacturing head 141 held by head holding part 221 can take a first posture 141*f*. Linear motion mechanism part 251 slides head holding part 221 in the −Z-axis direction so as to proceed from storage area 161 to machining area 160.

When additive manufacturing head 141 is stored in storage area 161, swing mechanism part 241 swings head holding part 221 so that additive manufacturing head 141 held by head holding part 221 can take a second posture 141*s*. Linear motion mechanism part 251 slides head holding part 221 in the +Z-axis direction so as to enter storage area 161 from machining area 160.

As shown in FIG. 10, when additive manufacturing head 141 is delivered between tool spindle 121 and head holding part 221, tool spindle 121 is swung to take a posture where spindle end face 123 is oriented in the +Z-axis direction, and rotation central axis 105 extends in the Z-axis direction, and head holding part 221 is swung to take first state 221F, and additive manufacturing head 141 takes first posture 141*f*. In first posture 141*f* of additive manufacturing head 141, laser tool 142 is oriented in the +Z-axis direction, and optical axis 107 extends in the Z-axis direction. Cable 146 is pulled out from head main body 151 in the +X-axis direction, and is bent in the +Z-axis direction while forming an arc.

The entire length in the vertical direction (X-axis direction) of additive manufacturing head 141 with first posture **141*f* is h. The uppermost part of additive manufacturing head 141 with first posture 141*f* is a curved part of cable 146, and the lowermost part of additive manufacturing head 141 with first posture 141*f* is head main body 151**.

As shown in FIG. 8, when additive manufacturing head 141 is stored in storage area 161, head holding part 221 is swung to come into second state 221S, and additive manufacturing head 141 takes second posture **141*s*. When additive manufacturing head 141 takes second posture 141*s*, laser tool 142** is oriented obliquely downward (−X-axis direction, and +Z-axis direction).

The entire length in the vertical direction (X-axis direction) of additive manufacturing head 141 with second posture **141*s* is H. The uppermost part of additive manufacturing head 141 with second posture 141*s* is a cover 144 that covers a piston cylinder (not shown) constituting a connection mechanism for tool spindle 121 and additive manufacturing head 141, and the lowermost part of additive manufacturing head 141 with second posture 141*s* is laser tool 142**.

As shown in FIGS. 8 and 10, the entire length H in the vertical direction of additive manufacturing head 141 with second posture **141*s* is shorter than the entire length h in the vertical direction of additive manufacturing head 141 with first posture 141*f* (H<h). The lowermost part of additive manufacturing head 141 with second posture 141*s* is disposed above the lowermost part of additive manufacturing head 141 with first posture 141*f***.

In this embodiment, processing machine 100 includes swing mechanism part 241 that can swing head holding part 221 centered on predetermined axis 201 in parallel with the horizontal direction (Y-axis direction). According to such a configuration, in machining area 160, additive manufacturing head 141 can take first posture **141*f* suitable for delivering additive manufacturing head 141 between tool spindle 121 and head holding part 221, and in storage area 161, additive manufacturing head 141 can take second posture 141*s* suitable for storing additive manufacturing head 141 by head stocker 210**.

More specifically, in processing machine 100, storage area 161 for storing additive manufacturing head 141 is disposed above second workpiece spindle 116. In this case, since the machine height of processing machine 100 is predefined, it is difficult to sufficiently secure the length (entire height) of storage area 161 in the vertical direction. The position of storage area 161 is high with respect to a movement end of tool spindle 121 in the +X-axis direction (stroke end on the upper end side). Accordingly, the position of additive manufacturing head 141 in the vertical direction in machining area 160 in the case of delivery between tool spindle 121 and head holding part 221, and the position of additive manufacturing head 141 in the vertical direction in the case of being stored in storage area 161 cannot coincide with each other.

On the other hand, according to this embodiment, the entire length H in the vertical direction of additive manufacturing head 141 with second posture **141*s* in storage area 161 is shorter than the entire length h in the vertical direction of additive manufacturing head 141 with first posture 141*f* in machining area 160. According to such a configuration, additive manufacturing head 141 can be stored in storage area 161 while the entire height of storage area 161 is kept low. In addition, according to this embodiment, the linear movement direction of head holding part 221 by linear motion mechanism part 251 is the horizontal direction (Z-axis direction). Consequently, the entire height of storage area 161** can be further reduced.

According to this embodiment, the lowermost part of additive manufacturing head 141 with second posture **141*s* in storage area 161 is disposed above the lowermost part of additive manufacturing head 141 with first posture 141*f* in machining area 160. According to such a configuration, additive manufacturing head 141 can be moved from machining area 160 to storage area 161 without interference with second workpiece spindle 116**.

FIGS. 12 to 17 are a perspective views showing steps of attaching the additive manufacturing head to the tool spindle. Note that in FIGS. 13 to 17, illustration of cable 146 is omitted.

Referring to FIGS. 12 to 17, opening part 168 forms an opening face in parallel with X- and Y-axes plane. Opening part 168 forms the opening face having a rectangular shape. Opening part 168 opens immediately above second workpiece spindle 116.

Opening part 168 includes a first opening part 168A, and a second opening part 168B. The opening parts that are first opening part 168A and second opening part 168B respectively form opening faces having rectangular shapes. First opening part 168A and second opening part 168B are aligned in the Y-axis direction. Second opening part 168B is disposed on a more forward side (+Y-axis direction side) of processing machine 100, where an operator stands, than first opening part 168A. The opening faces formed by first opening part 168A and second opening part 168B face head holding part 221 in the Z-axis direction. The opening face formed by second opening part 168B faces cable support part 261 (pulley part 262) in the Z-axis direction.

The opening area of first opening part 168A is smaller than the opening area of second opening part 168B. The opening width of first opening part 168A in the Y-axis direction is smaller than the opening width of second opening part 168B in the Y-axis direction.

First opening and closing cover 171 is provided at first opening part 168A. First opening and closing cover 171 can operate between a closed state in which first opening part 168A is blocked, and an open state in which first opening part 168A is open. Second opening and closing cover 172 is provided at second opening part 168B. Second opening and closing cover 172 can operate between a closed state in which second opening part 168B is blocked, and an open state in which second opening part 168B is open.

Figure 18:
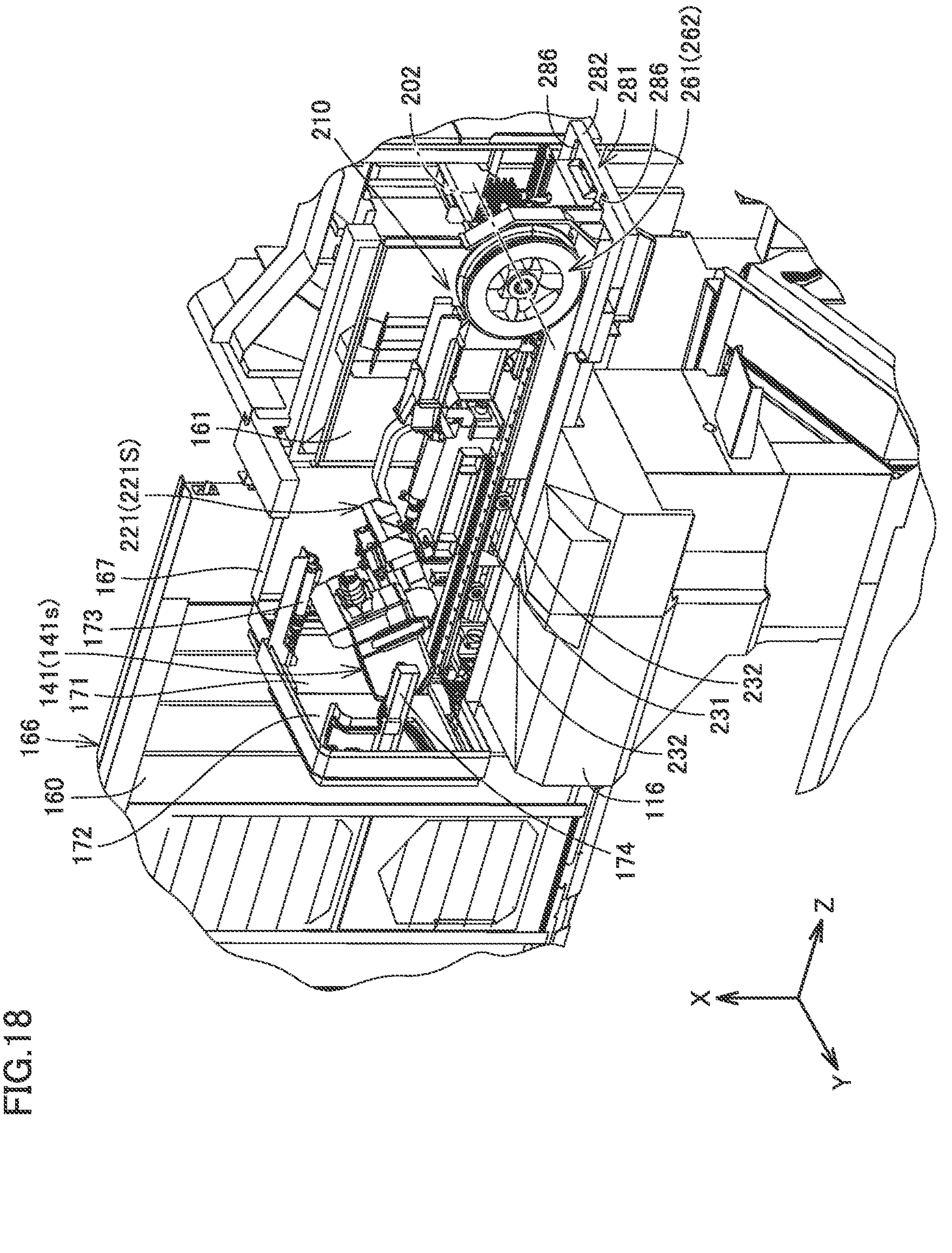
FIG. 18 is a perspective view for illustrating a structure for maintaining the head stocker.

First opening and closing cover 171 is supported by inner cover 167 rotatably centered on a rotation central axis 206. Rotation central axis 206 extends in the Y-axis direction. Rotation central axis 206 is disposed at an end (upper end) of first opening and closing cover 171 in the +X-axis direction. Second opening and closing cover 172 is supported by inner cover 167 rotatably centered on a rotation central axis 207. Rotation central axis 207 extends in the X-axis direction. Rotation central axis 207 is disposed at an end of second opening and closing cover 172 in the +Y-axis direction. As shown in FIG. 18 described later, a piston cylinder 173 and a piston cylinder 174 for respectively operating first opening and closing cover 171 and second opening and closing cover 172 are attached to inner cover 167.

Subsequently, steps of attaching of additive manufacturing head 141 to tool spindle 121 are described.

Figure 12:
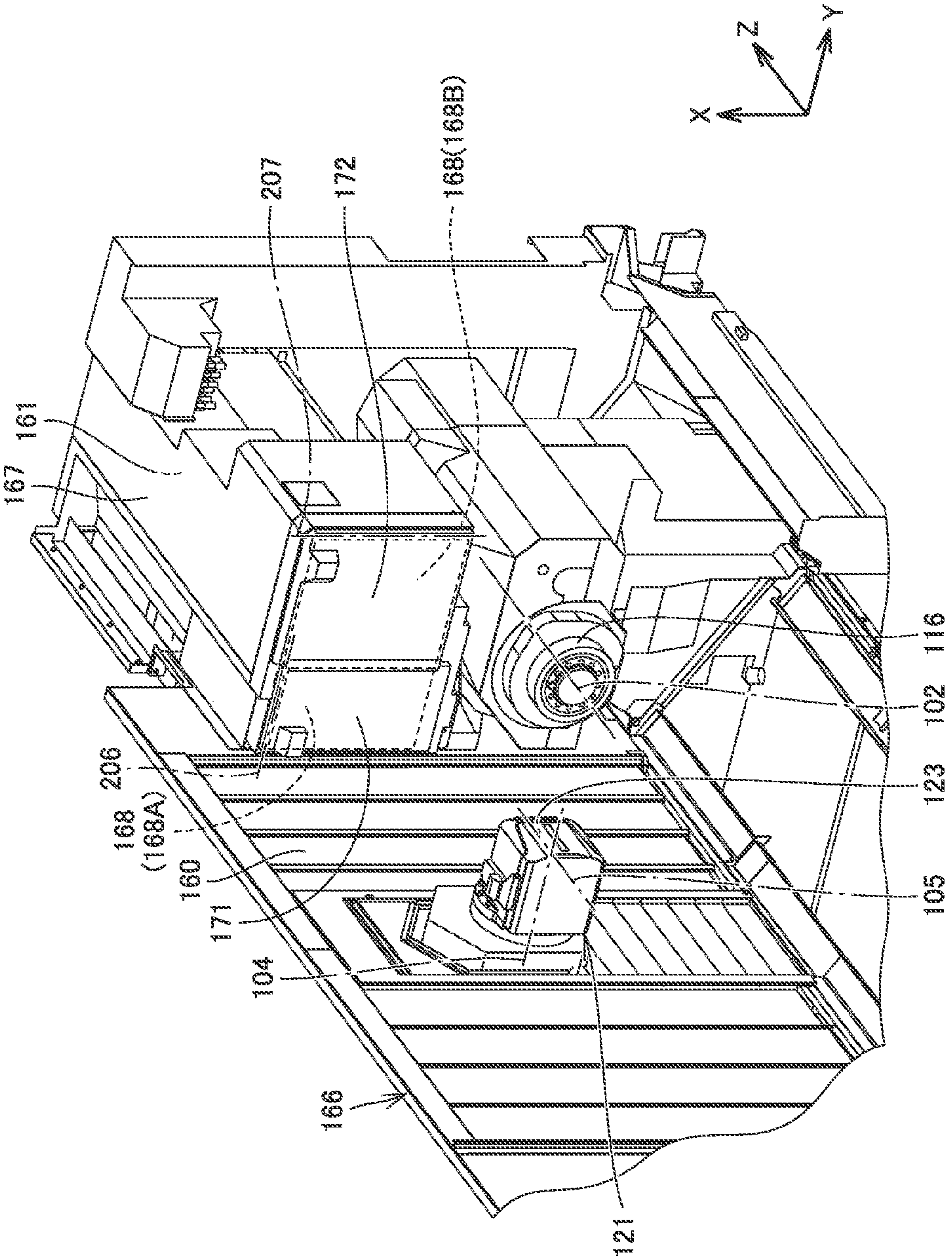
FIG. 12 is a perspective view showing a first step of attaching the additive manufacturing head to the tool spindle.

Note that the step shown in FIG. 8 corresponds to the step shown in FIG. 12. The step shown in FIG. 9 corresponds to a step between the step shown in FIG. 12 and the step shown in FIG. 13. Note that the step shown in FIG. 10 corresponds to the step shown in FIG. 13. Note that the step shown in FIG. 11 corresponds to the step shown in FIG. 14.

Referring to FIGS. 8 and 12, tool spindle 121 is moved to a position facing first opening and closing cover 171 and second opening and closing cover 172 in the Z-axis direction. Tool spindle 121 is swung to take a posture where spindle end face 123 is oriented in the +Z-axis direction and rotation central axis 105 extends in the Z-axis direction.

Figure 13:
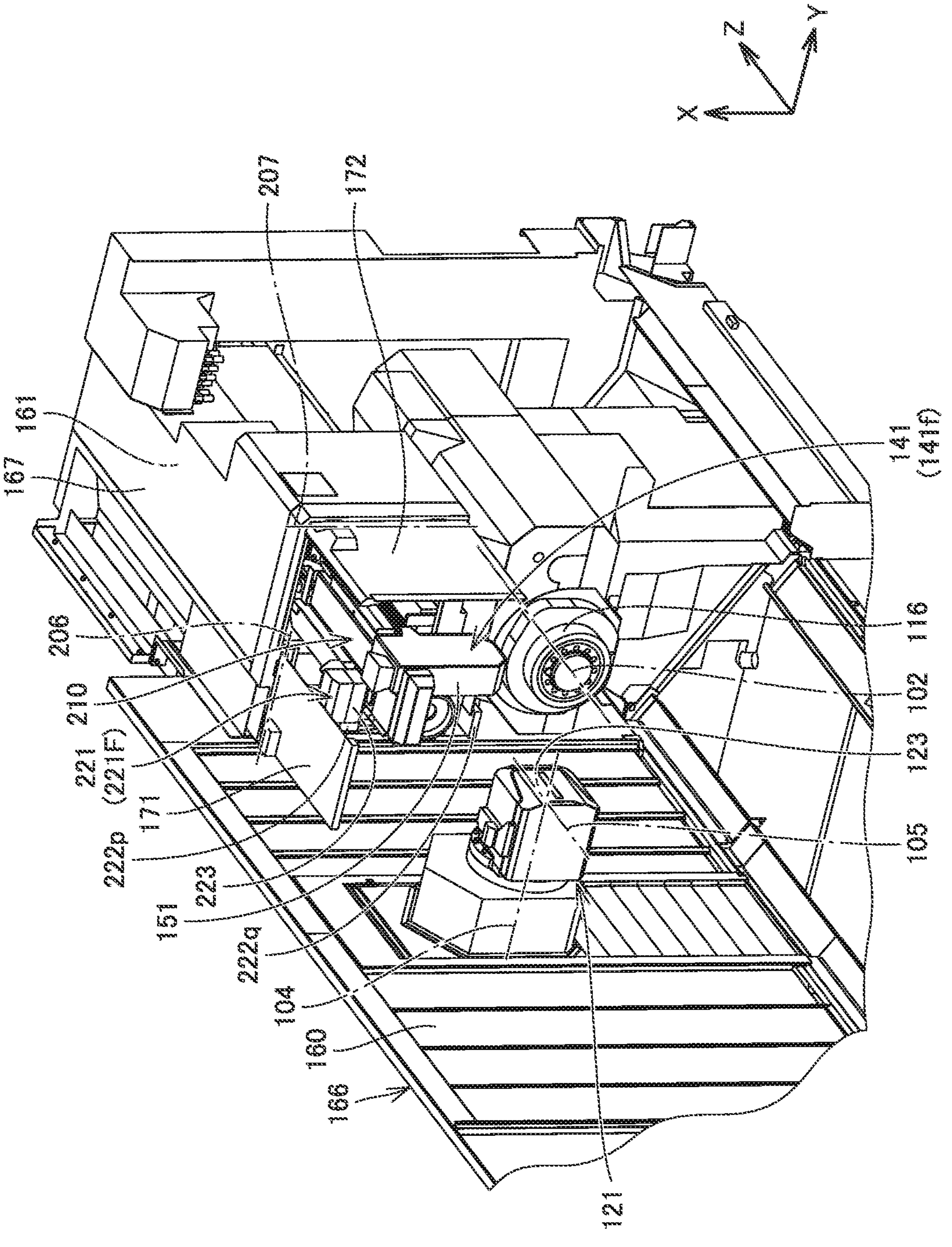
FIG. 13 is a perspective view showing a second step of attaching the additive manufacturing head to the tool spindle.

Referring to FIGS. 9, 10, and 13, next, the opening and closing covers that are first opening and closing cover 171 and second opening and closing cover 172 are operated into the open state, which opens opening part 168 (first opening part 168A and second opening part 168B).

Next, head holding part 221 is slid in the −Z-axis direction by linear motion mechanism part 251. Head holding part 221 is swung to take first state 221F from second state 221S by swing mechanism part 241. Accordingly, additive manufacturing head 141 held by head holding part 221 proceeds from storage area 161 into machining area 160, and takes first posture 141*f* in machining area 160.

Figure 14:
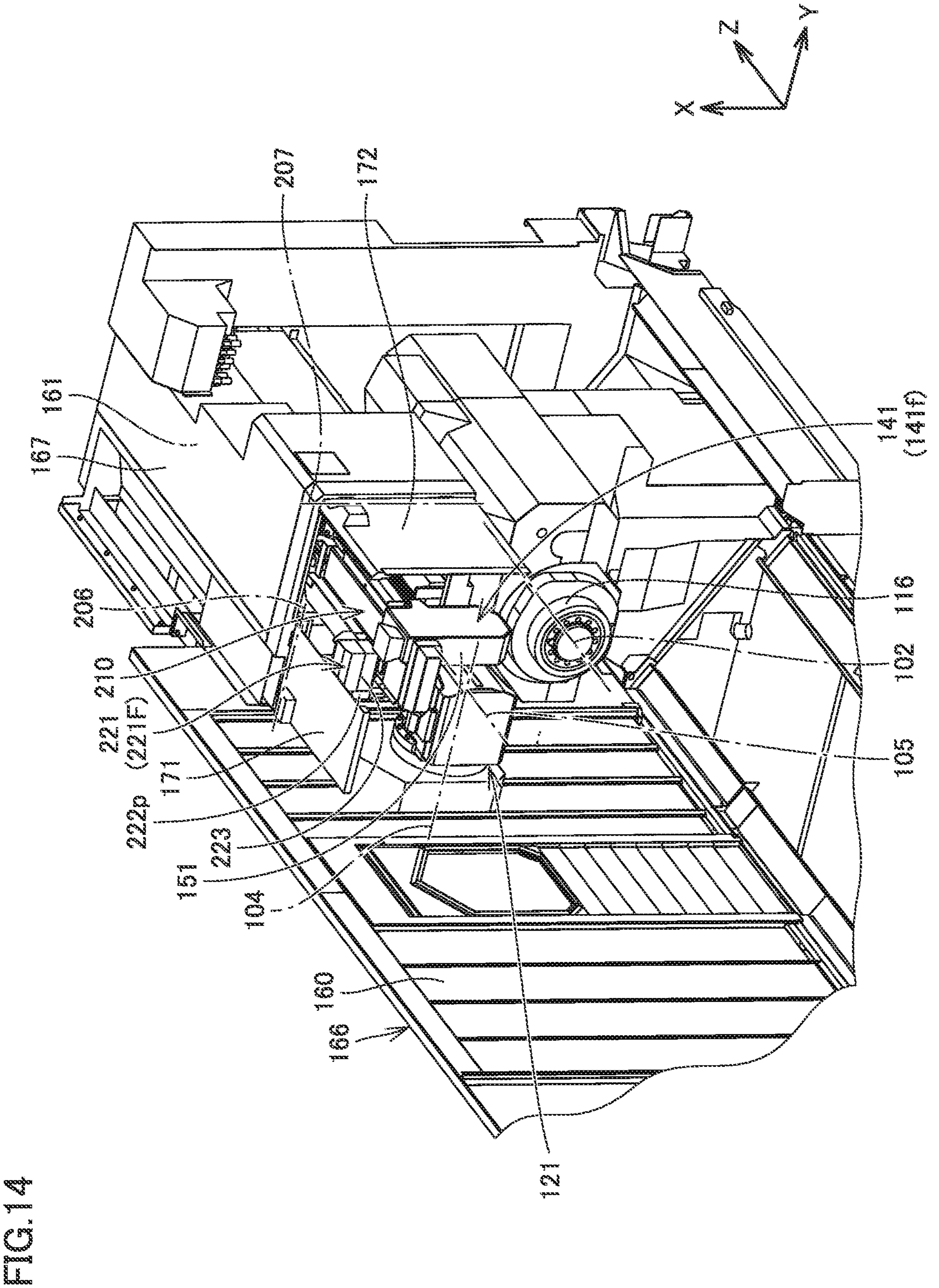
FIG. 14 is a perspective view showing a third step of attaching the additive manufacturing head to the tool spindle.
Figure 15:
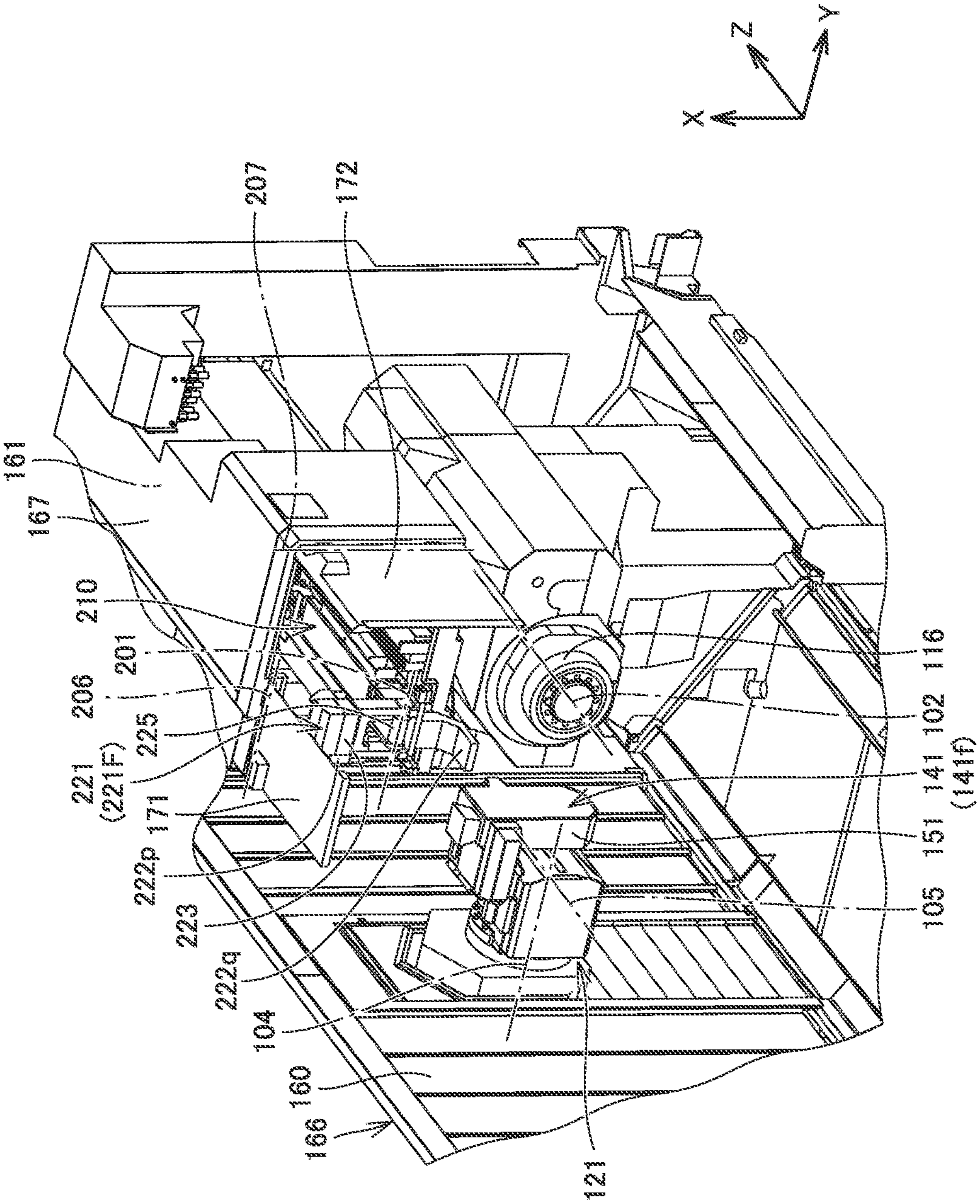
FIG. 15 is a perspective view showing a fourth step of attaching the additive manufacturing head to the tool spindle.

Referring to FIGS. 11, 14, and 15, next, additive manufacturing head 141 is attached to tool spindle 121, and holding of additive manufacturing head 141 by head holding part 221 is released, which allows additive manufacturing head 141 to be delivered from head holding part 221 to tool spindle 121.

More specifically, tool spindle 121 is moved in the +Z-axis direction, and is caused to approach additive manufacturing head 141. Next, by operating the connection mechanism (not shown), additive manufacturing head 141 is attached to tool spindle 121. By contraction driving of first actuator 223, multiple first pin members 230 on additive manufacturing head 141 side are respectively pulled out from multiple first pin insertion holes 153 on tool spindle 121 side (see FIGS. 2 and 7).

By moving tool spindle 121 slightly in the +X-axis direction, second pin member 226 on additive manufacturing head 141 side is pulled out from the second pin insertion hole provided in second block 155 on tool spindle 121 side, and third pin member 227 on additive manufacturing head 141 side is pulled out from the third pin insertion hole provided in third block 154 on tool spindle 121 side (see FIG. 7). Next, tool spindle 121 is moved in the −Z-axis direction.

Figure 16:
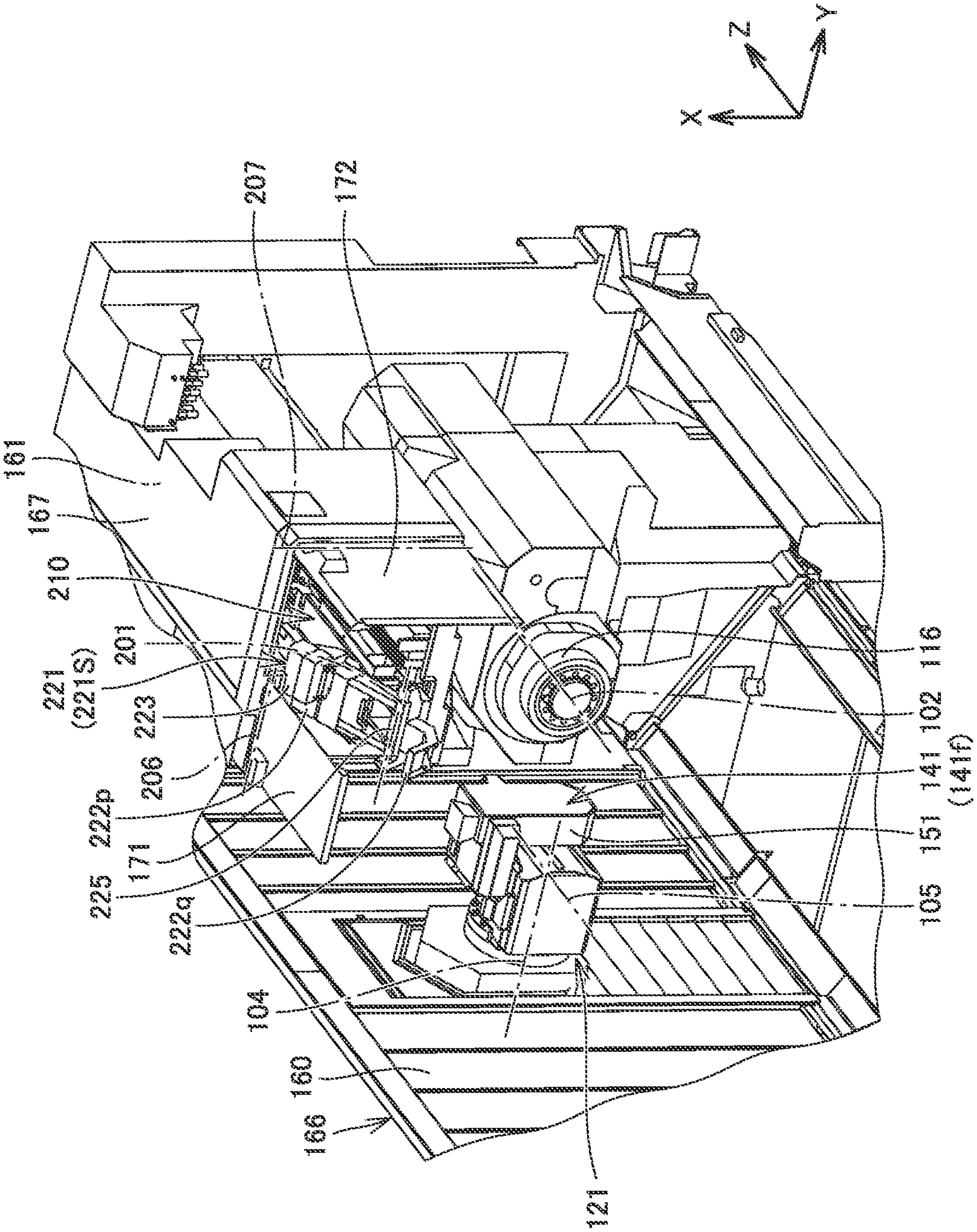
FIG. 16 is a perspective view showing a fifth step of attaching the additive manufacturing head to the tool spindle.
Figure 17:
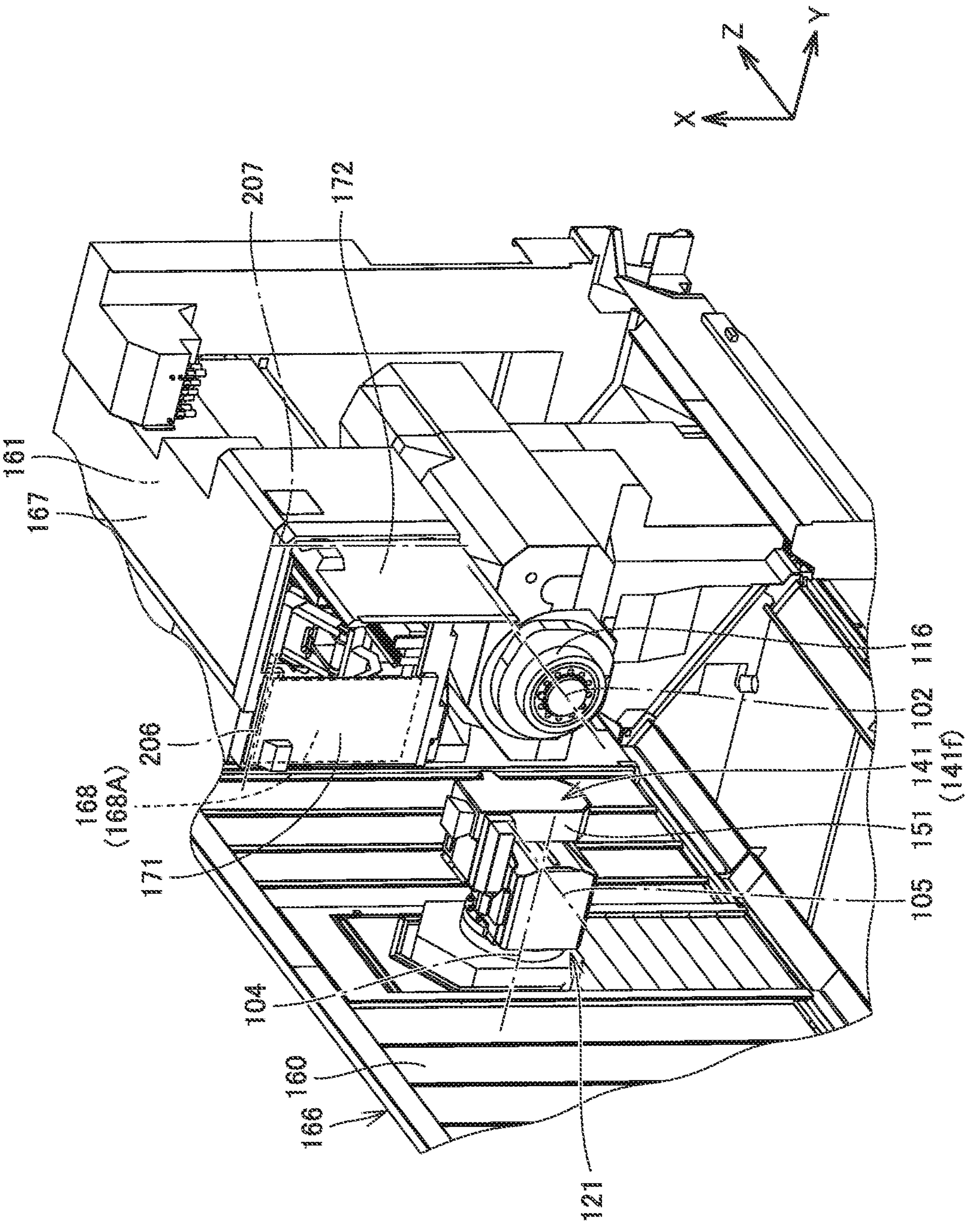
FIG. 17 is a perspective view showing a sixth step of attaching the additive manufacturing head to the tool spindle.

Referring to FIGS. 16 and 17, head holding part 221 is swung to come into second state 221S from first state 221F by swing mechanism part 241. Head holding part 221 is slid in the +Z-axis direction by linear motion mechanism part 251. Accordingly, head holding part 221 enters storage area 161 from machining area 160.

Next, by operating first opening and closing cover 171 to the closed state, only first opening part 168A between first opening part 168A and second opening part 168B is blocked. Cable 146 extending from additive manufacturing head 141 in machining area 160 passes through second opening part 168B and enters storage area 161.

In the subtractive manufacturing for a workpiece, when additive manufacturing head 141 is stored in storage area 161, first opening part 168A and second opening part 168B are respectively blocked with first opening and closing cover 171 and second opening and closing cover 172. Accordingly, chips, coolant and the like accompanying the subtractive manufacturing for a workpiece can be prevented from entering storage area 161 from machining area 160.

In the additive manufacturing for a workpiece, when cable 146 pulled out from additive manufacturing head 141 enters storage area 161 from machining area 160, first opening part 168A is blocked with first opening and closing cover 171, and second opening part 168B is open. Accordingly, the opening area of opening part 168 can be kept small in comparison with a case where opening part 168 is entirely open. Consequently, fumes and the like accompanying the additive manufacturing for a workpiece can be prevented from entering storage area 161 from machining area 160. The area of second opening and closing cover 172 is small in comparison with a case where a single opening and closing cover is provided. Accordingly, an adverse effect that second opening and closing cover 172 in the open state serves as an obstructive screen against the operator standing in front of processing machine 100 can be prevented.

In the case of transition from the subtractive manufacturing to the additive manufacturing for a workpiece, the case of transition from the additive manufacturing to the subtractive manufacturing for a workpiece, and the case of delivery of additive manufacturing head 141 in machining area 160 between tool spindle 121 and head holding part 221, first opening part 168A and second opening part 168B are open. Accordingly, the opening area of opening part 168 required to move head holding part 221 and additive manufacturing head 141 between machining area 160 and storage area 161 can be secured.

Note that opening part 168 provided at inner cover 167 may have a configuration where the opening area of second opening part 168B is smaller than the opening area of first opening part 168A. In this case, when first opening part 168A is blocked with first opening and closing cover 171 and second opening part 168B is opened in the additive manufacturing for a workpiece shown in FIG. 17, the opening area of opening part 168 can be further reduced.

Detachment of additive manufacturing head 141 from head holding part 221 is achieved by executing steps of attaching additive manufacturing head 141 to tool spindle 121 described above in the reverse order.

Figure 19:
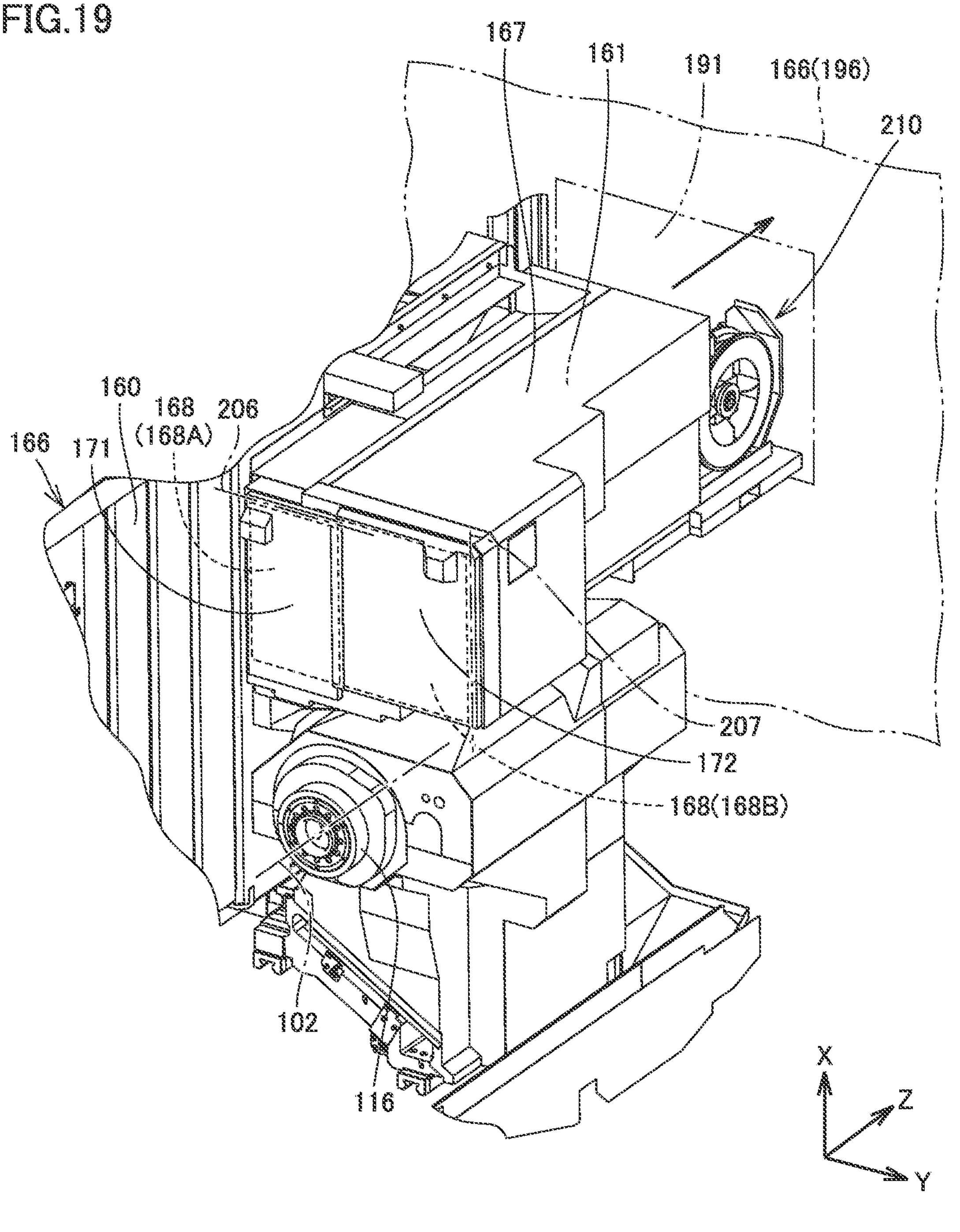
FIG. 19 is another perspective view for illustrating a structure for maintaining the head stocker.

FIG. 18 is a perspective view for illustrating the structure for maintaining the head stocker. FIG. 19 is another perspective view for illustrating the structure for maintaining the head stocker.

Referring to FIGS. 1, 18, and 19, head stocker support part 281 supports base 231 slidably in the horizontal direction between storage area 161 and an external space outside of cover body 166.

More specifically, head stocker support part 281 includes a support stage 282, and a plurality of leg parts 283. Support stage 282 is made up of a plate member which is disposed in parallel with the Y- and Z-axes plane and of which thickness direction is the X-axis direction. Multiple leg parts 283 have columnar shapes extending upward from bed 136. Support stage 282 is connected to the distal ends of multiple leg parts 283.

Head stocker support part 281 further includes a plurality of rails 286. Multiple rails 286 are provided on support stage 282. Each of rails 286 protrudes upward from support stage 282, and extends in the Z-axis direction. Multiple rails 286 are provided at intervals in the Y-axis direction.

Bed 231 is provided on support stage 282. Head stocker 210 further includes a plurality of wheels 232 (also see FIG. 4 in combination with FIG. 18). Multiple wheels 232 are attached to base 231. Each of wheels 232 is rotatable centered on the rotation central axis extending in the Y-axis direction. By engagement of wheels 232 with rails 286, base 231 is provided on support stage 282 slidably in the horizontal direction (Z-axis direction).

As shown in FIGS. 1 and 19, cover body 166 further includes a side cover 196, and a lid member 192. Side cover 196 is disposed in parallel with the X- and Y-axes plane. Side cover 196 forms an appearance of processing machine 100 at an end in the +Z-axis direction.

Cover body 166 (side cover 196) is provided with a maintenance opening part 191. Maintenance opening part 191 is made up of an opening that allows an external space outside of cover body 166 and storage area 161 to communicate with each other. Maintenance opening part 191 faces head stocker 210 in the Z-axis direction. Lid member 192 is provided so as to block maintenance opening part 191. Lid member 192 is detachably attached to side cover 196 using bolts and the like.

According to such a configuration, lid member 192 is detached from side cover 196, and base 231 is slid in the +Z-axis direction, thereby allowing head stocker 210 to be pulled out to the outside of cover body 166 through maintenance opening part 191. Accordingly, the maintenance capability in a case where head holding part 221, swing mechanism part 241, linear motion mechanism part 251, or cable support part 261 mounted on base 231 causes a failure can be improved.

The structure of processing machine 100 in the embodiment of the present invention described above is summarized as follows. Processing machine 100 as the work machine in this embodiment includes: cover body 166 that forms machining area 160 as a first space, and storage area 161 as a second space separated from machining area 160; additive manufacturing head 141 as a work head; and head stocker 210. Additive manufacturing head 141 performs additive manufacturing as work on a workpiece in machining area 160. Head stocker 210 stores additive manufacturing head 141 in storage area 161. Head stocker 210 includes: head holding part 221 that holds additive manufacturing head 141; and swing mechanism part 241 that swings head holding part 221 centered on predetermined axis 201.

According to processing machine 100 in the embodiment of the present invention configured as described above, head holding part 221 is swung centered on predetermined axis 201 by swing mechanism part 241, which can change additive manufacturing head 141 to take a posture suitable for being stored in storage area 161.

Note that the work head according to the present invention is not limited to additive manufacturing head 141, and may be, for example, a head for laser processing used for workpiece laser processing, or a head for measurement that includes a probe for measuring a workpiece.

The embodiment disclosed here is described as an example in all respects, and should not be construed to be limitative. The scope of the present invention is not indicated by the above description but is indicated by the claims. It is intended to encompass equivalent meanings of the claims, and all modifications in the range.

INDUSTRIAL APPLICABILITY

The present invention is applied to, for example, a processing machine that can perform the subtractive manufacturing and the additive manufacturing for a workpiece.

REFERENCE SIGNS LIST

100 Processing machine; 101, 102, 105, 202, 206, 207 Rotation central axis; 104, 106 Swing central axis; 107 Optical axis; 111 First workpiece spindle; 116 Second workpiece spindle; 121 Tool spindle; 123 Spindle end face; 131 Tool rest; 132 Swing part; 136 Bed; 141 Additive manufacturing head; 141*f* First posture; 141*s* Second posture; 142 Laser tool; 143 First cable guide part; 144 Cover; 146 Cable; 151 Head main body; 152 First block; 153 Insertion hole; 154 Third block; 155 Second block; 160 Machining area; 161 Storage area; 166 Cover body; 167 Inner cover; 168 Opening part; 168A First opening part; 168B Second opening part; 171 First opening and closing cover; 172 Second opening and closing cover; 173, 174 Piston cylinder; 191 Maintenance opening part; 192 Lid member; 196 Side cover; 201 Predetermined axis; 210 Head stocker; 221 Head holding part; 221F First state; 221S Second state; 222 Frame; 222*p* Upper frame part; 222*q* Lower frame part; 223 First actuator; 224, 228, 229 Plate member; 225 Shaft part; 226 Second pin member; 227 Third pin member; 230 First pin member; 231 Base; 232 Wheel; 236 First slide member; 237 Cylinder holding clasp; 241 Swing mechanism part; 242 Second posture; 243, 253 Cylinder case; 244, 254 Piston; 251 Linear motion mechanism part; 252 Third actuator; 256, 267 Linear guide; 261 Cable support part; 262 Pulley part; 263 Second slide member; 264 Second cable guide part; 265 Third cable guide part; 266 Elastic member; 281 Head stocker support part; 282 Support stage; 283 Leg part; 286 Rail.

The invention claimed is:

1. A work machine, comprising:
a cover body that forms a first space, and a second space separated from the first space;
a work head that performs work on a workpiece in the first space; and
a head stocker that stores the work head in the second space,
wherein the head stocker includes:
a head holding part that holds the work head; and
a swing mechanism part that swings the head holding part centered on a predetermined axis,
the swing mechanism part is configured to swing the head holding part to render the work head in a first posture when the work head is held by the head holding part, and
the swing mechanism part is configured to swing the head holding part to render the work head in a second posture when the work head is held by the head holding part and when the work head is stored in the second space.

2. The work machine according to claim 1, further comprising
a tool holding part that is movably provided in the first space, and holds a tool for subtractive manufacturing for a workpiece,
wherein the work head is detachably attached to the tool holding part.

3. The work machine according to claim 1, wherein a lowermost part of the work head with the second posture is disposed above the lowermost part of the work head with the first posture.

4. The work machine according to claim 1, wherein an entire length in a vertical direction of the work head with the second posture is smaller than the entire length in the vertical direction of the work head with the first posture.

5. The work machine according to claim 1,
wherein the work head includes a head main body held by the head holding part, and a cable extending from the head main body, and
the cover body includes:
an inner cover provided with an opening part that causes the first space and the second space to communicate with each other; and a first opening and closing cover and a second opening and closing cover that are provided at the opening part, and allow an opening and closing operation, when the work head performs work on the workpiece in the first space, the first opening and closing cover is brought into a closed state, and the second opening and closing cover is brought into an open state, thus allowing the cable to be drawn from the first space into the second space through the opening part, when the work head is delivered to the head holding part in the first space, the first opening and closing cover and the second opening and closing cover are brought into the open state, thus allowing the work head to be moved between the first space and the second space through the opening part, and when the work head is stored in the second space, the first opening and closing cover and the second opening and closing cover are brought into the closed state, thus separating the first space and the second space from each other.

6. The work machine according to claim 1, further comprising a workpiece spindle, a tailstock, or a workpiece steady rest that is provided below the work head stored in the second space.

7. The work machine according to claim 1, wherein the work head is an additive manufacturing head that emits laser light while supplying material powder to the workpiece.

8. The work machine according to claim 1, wherein the head stocker further includes a base that is provided in the second space, and mounts the head holding part and the swing mechanism part.

9. The work machine according to claim 8, wherein the head stocker further includes a linear motion mechanism part that is mounted on the base, and moves the head holding part back and forth between the first space and the second space by linearly moving the head holding part in a horizontal direction.

10. The work machine according to claim 8, wherein the work head includes a head main body held by the head holding part, and a cable extending from the head main body, and the head stocker further includes a cable support part that is mounted on the base, and supports the cable.

11. The work machine according to claim 8, further comprising a head stocker support part that supports the base slidably in a horizontal direction between the second space and an external space outside of the cover body.

* * * * *